US008478490B2

(12) United States Patent
Takenaka et al.

(10) Patent No.: US 8,478,490 B2
(45) Date of Patent: Jul. 2, 2013

(54) CONTROL DEVICE OF INVERTED PENDULUM TYPE VEHICLE

(75) Inventors: Toru Takenaka, Saitama (JP); Kazushi Akimoto, Saitama (JP); Shinichiro Kobashi, Saitama (JP); Hideo Murakami, Saitama (JP); Yuichi Uebayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/394,618

(22) PCT Filed: Sep. 18, 2009

(86) PCT No.: PCT/JP2009/004732
§ 371 (c)(1),
(2), (4) Date: Mar. 7, 2012

(87) PCT Pub. No.: WO2011/033581
PCT Pub. Date: Mar. 24, 2011

(65) Prior Publication Data
US 2012/0173086 A1    Jul. 5, 2012

(51) Int. Cl.
*G01P 15/14* (2013.01)
(52) U.S. Cl.
USPC .............................. 701/48; 701/82; 73/514.36
(58) Field of Classification Search
USPC .................... 701/82, 93; 73/514.36
See application file for complete search history.

(56) References Cited

U.S. PATENT DOCUMENTS

2009/0107240 A1*   4/2009   Senba et al. ............... 73/514.36

FOREIGN PATENT DOCUMENTS

| JP | 4-201793 A | 7/1992 |
| JP | 2004-129435 A | 4/2004 |
| JP | 2006-282160 A | 10/2006 |
| WO | 2008/132778 A1 | 11/2008 |
| WO | 2008/132779 A1 | 11/2008 |
| WO | 2008/139740 A1 | 11/2008 |

* cited by examiner

*Primary Examiner* — Mary Cheung
*Assistant Examiner* — Yuen Wong
(74) *Attorney, Agent, or Firm* — Carrier Blackman & Associates, P.C.; William D. Blackman; Joseph P. Carrier

(57) ABSTRACT

A control device of an inverted pendulum type vehicle capable of controlling fluctuation of a traveling velocity of a vehicle according to operating state of the vehicle. A traveling motion unit controlling element 50 of an inverted pendulum type vehicle 1 includes a first processing mode and a second processing mode. In the first processing mode, determines a manipulated variable for control so as to bring a tilt angle of a payload supporting part 3 and a traveling velocity of a representative point of the vehicle 1 closer to a desired value. In the second processing mode, the traveling motion unit controlling element 50 determines the manipulated variable for control while making a sensitivity to change of the manipulated variable for control with respect to a measured value of the traveling velocity of the representative point to be relatively lower than that in the first processing mode.

9 Claims, 19 Drawing Sheets

CONTROL DEVICE OF INVERTED PENDULUM TYPE VEHICLE

TECHNICAL FIELD

The present invention relates to a control device of an inverted pendulum type vehicle capable of moving on a floor surface.

BACKGROUND ART

Conventionally, there is known an inverted pendulum type vehicle, in which a base body assembled with a traveling motion unit which travels on a floor surface and an actuator unit which drives the traveling motion unit, is also assembled with a payload supporting part of an occupant which is capable of freely tilting with respect to the perpendicular direction. The inverted pendulum type vehicle is a vehicle with a necessity to move the traveling motion unit in a manner to move a fulcrum of the inverted pendulum, so as to maintain a tilt angle of the payload supporting part to a desired tilt angle (so as to prevent the payload supporting part from fall due to tilting).

As a control technology of this type of the inverted pendulum type vehicle, for example, the one found in Patent Document 1 had been proposed by the present applicant.

In the Patent Document 1, there is disclosed a control technology of an inverted pendulum type vehicle in which a base body of a vehicle assembled with a payload supporting part of an occupant is provided so as to be freely tiltable about two axes, specifically about one axis in a longitudinal direction and about the other axis in a lateral direction, with respect to the ball-shaped traveling motion unit. In this technology, a driving torque of a motor is sequentially determined so as to make a difference between a measured value of a tilt angle of the base body (=tilt angle of the payload supporting part) and a desired tilt angle closer to 0, and also to make the difference between a measured value of a velocity of the motor as an actuator unit (and consequently a moving velocity of the traveling motion unit) and a desired velocity closer to 0. Thereafter, the traveling motion of the traveling motion unit is controlled via the motor, in accordance with the determined drive torque.

The present applicant further proposes vehicles capable of functioning as the inverted pendulum type vehicle, such as those found in Patent Documents 2 and 3.

PRIOR ART REFERENCES

Patent Documents

Patent Document 1: U.S. Pat. No. 3,070,015
Patent Document 2: Published PCT International Applications WO/2008/132778
Patent Document 3: Published PCT International Applications WO/2008/132779

SUMMARY OF THE INVENTION

Problems to be Solved by the Invention

In the inverted pendulum type vehicle such as those shown in Patent Documents 1 through 3, it is generally difficult to retain a tilt angle of the payload supporting part (or a base body) stably to a constant value. That is, even when the occupant tries to retain the tilt angle of the payload supporting part to a constant value, variation (staggering) in the tilt angle is generally generated. Therefore, in the steady state in which the tilt angle of the payload supporting part is generally retained constantly, it is conceivable that it is desired to control the traveling motion of the traveling motion unit in order to rapidly resolve the variation in the traveling velocity, in order to suppress the traveling velocity of the traveling motion unit (traveling velocity of the overall vehicle) from frequently changing accompanying the minute variation of the tilt angle. That is, it is conceivable that it is desirable to control the actuator such as the motor so that the driving force for restraining the variation to be imparted to the traveling motion unit with good sensitivity with respect to the variation in the traveling velocity.

On the other hand, for example, in the case where the occupant is intentionally trying to change the traveling velocity of the vehicle, such as in the case where the occupant is trying to increase the traveling velocity of the vehicle in the occupant's fore-and-aft direction and the like, it is conceivable that it is desired to smoothly perform the change in the traveling velocity. However, in the case where the sensitivity to the variation in the driving force to be imparted to the traveling motion unit with respect to the variation in the traveling velocity is made high, there is a fear that smooth change in the traveling speed of the vehicle is inhibited.

The present invention have been made in view of such background, and aims to provide a control device of an inverted pendulum type vehicle capable of appropriately controlling the variation of the traveling velocity of the vehicle according to the operation state of the vehicle and the like.

Means for Solving the Problems

In order to achieve such aim, a control device of an inverted pendulum type vehicle of the present invention is a control device of an inverted pendulum type vehicle having a traveling motion unit capable of moving on a floor surface, an actuator which drives the traveling motion unit, a base body on which the traveling motion unit and the actuator are mounted, and a payload supporting part of an occupant assembled to the base body so as to be tillable with respect to a perpendicular direction, comprising:

a tilt angle measuring element which generates an output according to an actual tilt angle of the payload supporting part;

a representative point velocity measuring element which generates an output according to a traveling velocity of a predetermined representative point of the vehicle; and a traveling motion unit controlling element which determines a manipulated variable for control which defines a driving force to be imparted to the traveling motion unit, and which controls the traveling motion of the traveling motion unit via the actuator according to the determined manipulated variable for control;

wherein the traveling motion unit controlling element includes, as processing modes for determining the manipulated variable for control in a state where the occupant is aboard the payload supporting part, a first processing mode and a second processing mode, the second processing mode being the mode which is transited from the first processing mode in the case where a predetermined first condition is satisfied during carrying out of the processing of the first processing mode, and the traveling motion unit controlling element determines, in the first processing mode, the manipulated variable for control at least according to a tilt error, which is an error between a measured value of the tilt angle of the payload supporting part indicated by the output of the tilt angle measuring element and a predetermined value of a desired tilt angle, and a velocity error, which is an error between a measured value of the traveling velocity of the representative point indicated by the output of the representative point velocity measuring element and a predetermined value of a desired traveling velocity, so as to bring the tilt error and the representative point velocity error closer to 0, and the traveling motion unit controlling element determines, in the second processing mode, the manipulated variable for control at least according to the tilt error, so as to make a sensitivity to change of the manipulated variable for control with respect to a change in the measured value of the traveling velocity of the representative point or in a component in a predetermined direction out of the measured value of the traveling velocity of the representative point relatively smaller than that in the first processing mode, and so as to bring at least the tilt error out of the tilt error and the velocity error closer to 0 (a first aspect of the invention).

Further, in the present invention, the term "floor" will be used to include an outdoor ground surface or a road surface rather than meaning only a floor in an ordinary sense (e.g., an indoor floor).

According to the first aspect of the invention, the traveling motion unit controlling element determines the manipulated variable for control so as to bring the tilt error and the velocity error closer to 0 in the first processing mode. Therefore, if the actual traveling velocity of the representative point, and consequently the velocity error, tends to fluctuate, resulting from the fluctuation in the actual tilt angle of the payload supporting part and the like, the manipulated variable for control is decided so as to impart the driving force restricting the fluctuation to the traveling motion unit. As a result, in the first processing mode, the stability of the traveling velocity of the representative point in the situation where the tilt error is approximately retained stable is enhanced.

On the other hand, in the case where the predetermined first condition is satisfied during carrying out of the first processing mode, the traveling motion unit controlling element carries out the processing of the second processing mode. In the second processing mode, the traveling motion unit controlling element determines the manipulated variable for control so as to make the sensitivity to change of the manipulated variable for control with respect to the change in the measured value of the traveling velocity of the representative point or change in the component in the predetermined direction out of the measured value of the traveling velocity of the representative point relatively smaller than that in the first processing mode, and to bring at least the tilt error out of the tilt error and the velocity error closer to 0. Here, the term the sensitivity is relatively smaller than that in the first processing mode includes the case where the sensitivity becomes 0 (the manipulated variable for control does not depend on the change in the measured value of the traveling velocity of the representative point or change in the component in the predetermined direction out of the measured value of the traveling velocity of the representative point).

Therefore, in the second processing mode, the driving force to be imparted to the traveling motion unit becomes difficult to change or does not change, with respect to the change in the actual traveling velocity of the representative point or the component in the predetermined direction out of the traveling velocity of the representative point. As such, an automatic control of the actual traveling velocity of the representative point is moderated or resolved. Therefore, the traveling velocity of the representative point becomes easier to flexibly change by the external force and the like.

Therefore, according to the first aspect of the invention, it becomes possible to appropriately control the variation in the traveling velocity of the vehicle according to the operational state of the vehicle and the like.

Further, in the first aspect of the invention, as the predetermined first condition, a condition related to, for example, the operational condition of the vehicle, the steering operation condition, or an environmental condition, may be adopted.

Further, an overall center-of-gravity point of the occupant boarding the payload supporting part and the vehicle, or a point on a predetermined position of the traveling motion unit or the base body, may be used as the representative point.

Further, as the predetermined desired traveling velocity related to the traveling velocity of the representative point, for example, it is conceivable that a velocity in which the magnitude thereof becomes a value within a predetermined range in the vicinity of 0 (including 0) is adopted. In such case, it becomes possible to maintain the actual traveling velocity of the representative point to 0 or approximately 0, in the state where the tilt error becomes 0 or approximately 0.

Further, for example, the tilt angle of the payload supporting part in the state where the overall center-of-gravity point of the portion capable of tilting integrally with the payload supporting part (including the occupant), out of the total of the occupant aboard the payload supporting part and the vehicle, is positioned directly above or approximately directly above the tilting center (fulcrum of tilting) of the payload supporting part (that is, the state where the moment generating around the tilting center becomes 0 or substantially 0, from the gravity acting on the center-of-gravity point), is preferably adopted as the desired tilt angle of the predetermined value with respect to the tilt angle of the payload supporting part.

In the inverted pendulum type vehicle according to the first aspect of the invention, the traveling motion unit may be configured to be capable of moving in a predetermined one direction on a floor surface, and the payload supporting part may be assembled to the base body so as to be tiltable about one axis in a direction perpendicular to the predetermined one direction.

Or it is preferable that the traveling motion unit is configured to be capable of moving in all directions including a first direction and a second direction which are orthogonal to each other on a floor surface, and the payload supporting part is assembled to the base body so as to be tiltable about two axes, about the axis in the first direction and about the axis in the second direction. In such case, especially, it is preferable that the traveling motion unit controlling element determines, in the first processing mode, the manipulated variable for control so as to bring a first tilt error component, which is a component about an axis in the second direction, and a second tilt error component, which is a component about an axis in the first direction, out of the tilt error, a first velocity error component, which is a component in the first direction, and a second velocity error component, which is a component in the second direction, out of the velocity error, closer to 0, respectively, and the traveling motion unit controlling element determines, in the second processing mode, the manipulated variable for control, so as to make a sensitivity to change of the manipulated variable for control with respect to the change in at least the component in the first direction out of the measured value of the traveling velocity of the representative point to be relatively smaller than that in the first processing mode, and also to bring at least the first tilt error component and the second tilt error component out of the first tilt error component, the second tilt error component, the first velocity error component, and the second velocity error component, closer to 0 (a second aspect of the invention).

In the second aspect of the invention, the traveling motion unit "being capable of moving in all directions, including the first direction and the second direction" means that the orientation of the velocity vector of the traveling motion unit at each instant observed in an axial direction orthogonal to the first direction and the second direction could take an orientation of an arbitrary angular orientation about the aforesaid axial direction when the traveling motion unit is driven by the actuator. In this case, the aforesaid axial direction is approximately a vertical direction or a direction perpendicular to a floor surface. Further, the term "orthogonal" in the present invention does not have to be orthogonal in a strict sense, and may slightly deviate from being orthogonal in the strict sense as long as it does not deviate from the nature of the present invention.

According to the second aspect of the invention, in the first processing mode, in the state where the tilt error is retained approximately constant, the stability of the traveling velocity of the representative point in all directions including the first direction and the second direction is enhanced. Further, in the second processing mode, the traveling velocity of the representative point at least in the first direction becomes easier to change with flexibility. Therefore, it becomes possible to freely change the traveling velocity of the representative point at least in the first direction in a desired form.

In the second aspect of the invention, it is capable to adopt an embodiment in which the sensitivity to change of the manipulated variable for control with respect to the change in the component in the second direction out of the measured value of the traveling velocity of the representative point to be the same as that in the first processing mode, and an embodiment in which it is different from that in the first processing mode.

In this case, specifically in the case where the first direction and the second direction are set to each of the fore-and-aft direction and the lateral direction of the occupant aboard the payload supporting part, it is preferable that the traveling motion unit controlling element determines, in the second processing mode, the manipulated variable for control at least according to the first tilt error component, the second tilt error component, and the second velocity error component, so as to make the sensitivity to change of the manipulated variable for control with respect to the change in at least the component in the first direction out of the measured value of the traveling velocity of the representative point relatively smaller than that in the first processing mode and so as not to make the sensitivity to change of the manipulated variable for control with respect to the change in the component in the second direction out of the measured value of the traveling velocity of the representative point smaller than that in the first processing mode, and to bring at least the first tilt error component, the second tilt error component, and the second velocity error component out of the first tilt error component, the second tilt error component, the first velocity error component, and the second velocity error component closer to 0 (a third aspect of the invention).

According to the third aspect of the invention, in the second processing mode, the flexible change in the traveling velocity of the representative point is possible in the fore-and-aft direction of the occupant (the first direction), and on the other hand, the fluctuation in the traveling velocity of the representative point is restrained to be equal to that in the first processing mode, or restrained stronger than the same, in the lateral direction of the occupant (the second direction). Stated otherwise, in the second processing mode, out of the traveling velocity of the representative point, the component in the fore-and-aft direction of the occupant is easier to change, but the component in the lateral direction of the occupant is difficult to change.

The traveling of the vehicle is, in most cases, performed in the fore-and-aft direction of the occupant or in a direction close thereto. And, according to the third aspect of the invention, in the case where the vehicle is made to travel in the fore-and-aft direction of the occupant or in the direction close thereto, it becomes possible to restrain the traveling velocity of the representative point of the vehicle from fluctuation in the lateral direction, resulting from staggering of the upper body of the occupant in the lateral direction of the occupant and the like. The maneuvering operation of the vehicle for making the vehicle travel in the fore-and-aft direction of the occupant or in the direction close thereto is made easy.

In the first aspect of the invention, as a more specific embodiment, a following embodiment may be adopted. That is, it is preferable that the traveling motion unit is capable of traveling on the floor at least in the first direction as the predetermined direction, and the manipulated variable for control at least includes a first manipulated variable for control which defines a driving force to be imparted to the traveling motion unit so as to control the traveling motion of the traveling motion unit in the first direction. Further, the traveling motion unit controlling element determines, in the first processing mode, the first manipulated variable for control by a first synthesis processing which synthesizes a predetermined plurality of kinds of manipulated variable components including at least a first a manipulated variable component obtained by multiplying the tilt error about the axis in a direction orthogonal to the first direction by a first a gain coefficient and a first b manipulated variable component obtained by multiplying the velocity error in the first direction by a first b gain coefficient, and determines, in the second processing mode, the first manipulated variable for control by the first synthesis processing using any one of a first c manipulated variable component obtained by multiplying the velocity error in the first direction by a first c gain having smaller absolute value than the first b gain coefficient, a first d manipulated variable component obtained by multiplying an error between the measured value of the traveling velocity of the representative point in the first direction and a desired traveling velocity of the representative point in the first direction determined variably according to the measured value so as to coincide with or follow the measured value by a first d gain coefficient, and 0, in place of the first b manipulated variable component (a fourth aspect of the invention).

According to the fourth aspect of the invention, the traveling motion unit controlling element determines, in the first processing mode, the first manipulated variable for control for controlling the traveling motion of the traveling motion unit in the first direction by a first synthesis processing which synthesizes a predetermined plurality of kinds of manipulated variable components including at least the first a manipulated variable component and the first b manipulated variable component. By doing so, it becomes possible to determine the first manipulated variable for control so as to bring the tilt error and the velocity error closer to 0.

Thereafter, in the second processing mode, the traveling motion unit controlling element determines, the first manipulated variable for control by the first synthesis processing using any one of the first c manipulated variable component, the first d manipulated variable component, and 0, in place of the first b manipulated variable component. By doing so, in the second processing mode, it becomes possible to make the sensitivity to change of the manipulated variable for control with respect to the change in at least the component in the first direction out of the measured value of the traveling velocity of the representative point to be relatively lower than that in the first processing mode. Consequently, it becomes possible to flexibly change the traveling velocity of the representative point in the first direction with the external force and the like.

Further, in the second aspect of the invention or the third aspect of the invention, when the manipulated variable for control is configured from a first manipulated variable for control which defines a driving power to be imparted to the traveling motion unit so as to control the traveling motion of the traveling motion unit in the first direction, and a second manipulated variable for control which defines a driving power to be imparted to the traveling motion unit so as to control the traveling motion of the traveling motion unit in the second direction, it is preferable that the traveling motion unit controlling element determines, in the first processing mode, the first manipulated variable for control by a first synthesis processing which synthesizes a predetermined plurality of kinds of manipulated variable components including at least a first a manipulated variable component obtained by multiplying the first tilt error component by a first a gain coefficient and a first b manipulated variable component obtained by multiplying the first velocity error component by a first b gain coefficient, and determines the second manipulated variable for control by a second synthesis processing which synthesizes a predetermined plurality of kinds of manipulated variable components including at least a second a manipulated variable component obtained by multiplying the second tilt error component by a second a gain coefficient, and a second b manipulated variable component obtained by multiplying the second velocity error component by a second b gain coefficient. Further, it is preferable that the traveling motion unit controlling element determines, in the second processing mode, the first manipulated variable for control by the first synthesis processing using any one of a first c manipulated variable component obtained by multiplying the first velocity error by a first c gain coefficient having smaller absolute value than the first b gain coefficient, a first d manipulated variable component obtained by multiplying an error between a component in the first direction out of the measured value of the traveling velocity of the representative point and a desired traveling velocity of the representative point in the first direction determined variably according to the component so as to coincide with or follow the component by a first d gain coefficient, and 0, in place of the first b manipulated variable component, and determines the second manipulated variable for control by the second synthesis processing which is the same as that in the first processing mode (a fifth aspect of the invention).

According to the fifth aspect of the invention, with respect to the traveling of the representative point of the vehicle in the first direction, it becomes possible to flexibly change the traveling velocity of the representative point in the first direction with the external force and the like, similar to the fourth aspect of the invention.

On the other hand, with respect to the traveling of the representative point of the vehicle in the second direction, the second manipulated variable for control is determined by the second synthesis processing which is identical in the first processing mode and the second processing mode. Therefore, in either mode of the first processing mode and the second processing mode, the controllability of the traveling velocity of the representative point in the second direction with respect to the desired traveling velocity increases. As a result, it becomes possible to restrain the fluctuation of the traveling velocity of the representative point in the second direction.

The fifth aspect of the invention is especially preferable to be combined with the third aspect of the invention. By doing so, it becomes possible to enhance flexibility of the traveling velocity of the representative point in the fore-and-aft direction of the occupant, and as well as enhance restriction of the traveling velocity of the representative point in the lateral direction of the occupant. As a result, the maneuverability of the vehicle is enhanced.

Supplementarily, in the second aspect of the invention, with respect to the traveling of the representative point of the vehicle in the second direction, similarly to the case of traveling of the representative point in the first direction, it is possible to make the sensitivity to change of the manipulated variable for control with respect to the change in the component in the second direction out of the measured value of the traveling velocity of the representative point to be relatively lower than that in the first processing mode. In this case, the second manipulated variable for control may be determined in the same manner as that in the first manipulated variable for control.

In the first through fifth aspect of the invention explained above, it is preferable that the traveling motion unit controlling element restarts the processing of the first processing mode, in the case where a predetermined second condition is satisfied during carrying out of the processing of the second processing mode (a sixth aspect of the invention).

According to the sixth aspect of the invention, the second processing mode is returned to the first processing mode, in the case where the second condition is satisfied, so that it becomes possible to selectively perform the operation of the vehicle in the first processing mode and the operation of the vehicle in the second processing mode so as to adjust the same to the operating state of the vehicle and the like.

According to the sixth aspect of the invention, preferably, comprises an acceleration request determining element which determines whether or not an acceleration request, which is a request for increasing the traveling velocity of the representative point, is generated, wherein the traveling motion unit controlling element starts carrying out of the processing of the second processing mode, determining that the predetermined first condition is satisfied, in the case where the determination result of the acceleration request determining element becomes affirmative during carrying out of the processing of the first processing mode (a seventh aspect of the invention).

According to the seventh aspect of the invention, in the case where the determination result of the acceleration request determining element becomes affirmative, that is in the case where the acceleration request has been generated, the carrying out of the processing of the second processing mode is started. Therefore, it becomes possible to smoothly increase the traveling velocity of the representative point in the state where acceleration request has been generated.

Further, in the seventh aspect of the invention, preferably the traveling motion unit controlling element restarts the processing of the first processing mode, determining that the predetermined second condition is satisfied, in the case where a state in which the determination result of the acceleration request determining element becomes negative is continued for a predetermined period during carrying out of the processing of the second processing mode (an eighth aspect of the invention).

According to the eighth aspect of the invention, when the state where the acceleration request is generated continuously or intermittently is resolved, it becomes possible to maintain the processing mode at the second processing mode from such resolving until lapse of the predetermined time. Therefore, in a predetermined period after increasing of the traveling velocity of the representative point, it becomes possible to maintain the state where the driving force to be imparted to the traveling motion unit is difficult to receive influence of the traveling velocity of the representative point. As a result, it becomes possible to prevent the driving power for positively fluctuating the traveling velocity of the representative point from being imparted to the traveling motion unit, by the occupant trying to maintain the tilt angle of the payload supporting part, after increasing the traveling velocity of the representative point. Consequently, it becomes possible to embody the state where the vehicle glides by an inertia force, after increasing the traveling velocity of the representative point, without the need for the occupant to perform special maneuvering.

Further, in the seventh or the eighth aspect of the invention, preferably, the vehicle is a vehicle capable of increasing the traveling velocity of the representative point by an external force other than the propulsive force of the vehicle generated by driving the traveling motion unit with the actuator, in the case where the external force is imparted, and the acceleration request determining element determines whether or not the acceleration request is generated, according to a velocity rate of change which is at least a temporal change rate of a magnitude of the measured value of the traveling velocity of the representative point or a temporal change rate of a magnitude of a component in the predetermined direction out of the measured value (a ninth aspect of the invention).

According to the ninth aspect of the invention, the acceleration request determining element determines whether or not the acceleration request has been generated, on the basis of at least the velocity rate of change, so that the determination may be made in line with the actual operating condition of the vehicle. Consequently, it becomes possible to transit from the first processing mode to the second processing mode at an appropriate timing in line with the actual operational state of the vehicle.

In the ninth aspect of the invention, it is conceivable to determine whether or not the acceleration request has been generated, taking the state where the velocity change rate becomes larger than a predetermined threshold value, as a necessary condition (or a necessary and sufficient condition) for determining that the acceleration request has been generated.

Further, in the ninth invention, for example, if the payload supporting part is constructed to enable an occupant on the payload supporting part to place his/her foot on a floor as needed, it is possible to apply the external force to the vehicle by the occupant kicking the floor with his/her feet. Alternatively, for example, an external force may be applied to the vehicle as appropriate by a worker or an assistant or an appropriate device outside the vehicle.

MODE FOR CARRYING OUT THE INVENTION

First Embodiment

The following will describe a first embodiment of the present invention. First, referring to FIG. 1 to FIG. 6, the structure of an inverted pendulum type vehicle in the present embodiment will be described.

Figure 1:
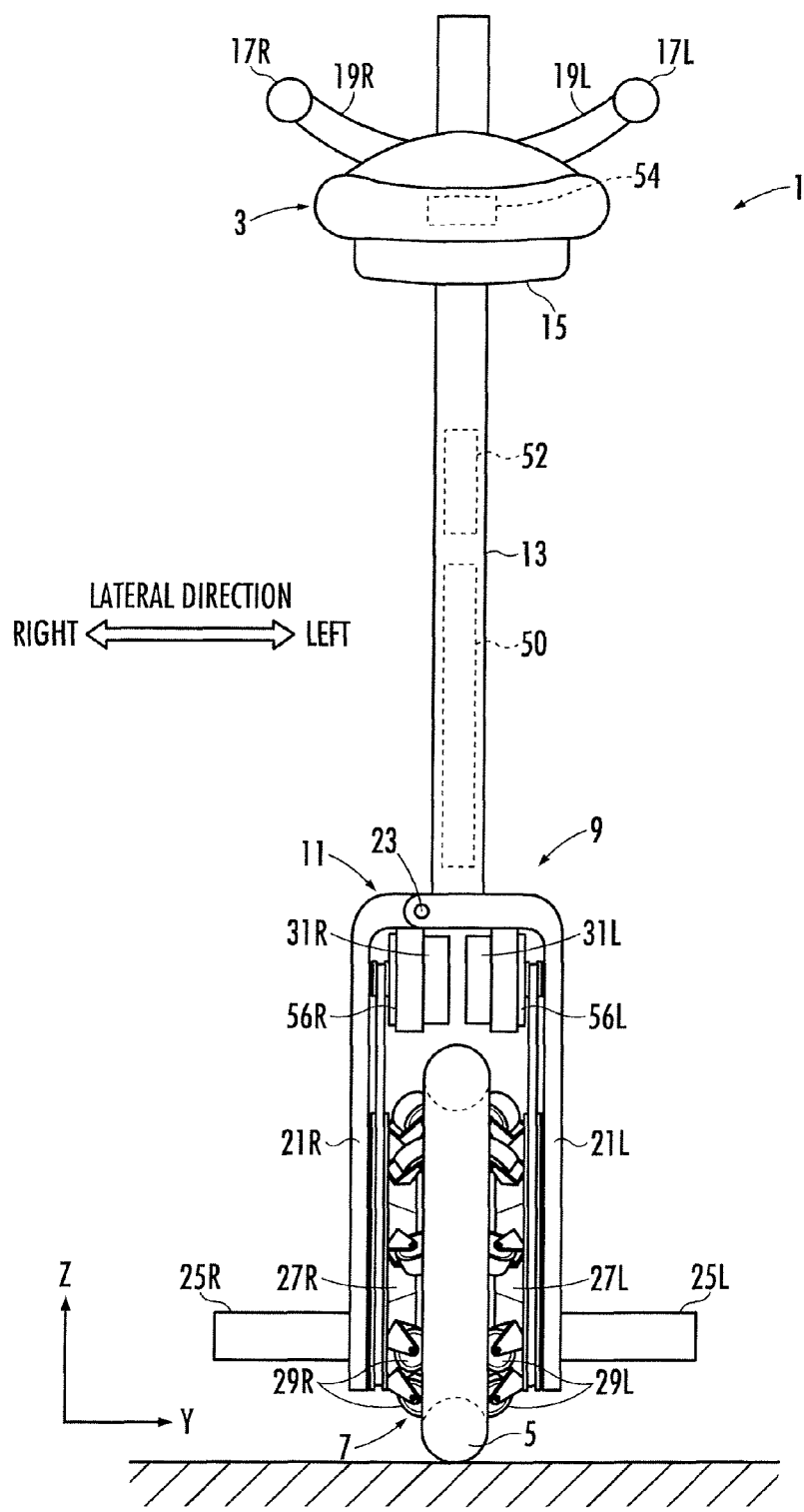
FIG. 1 is a front diagram of an inverted pendulum type vehicle according to an embodiment.
Figure 2:
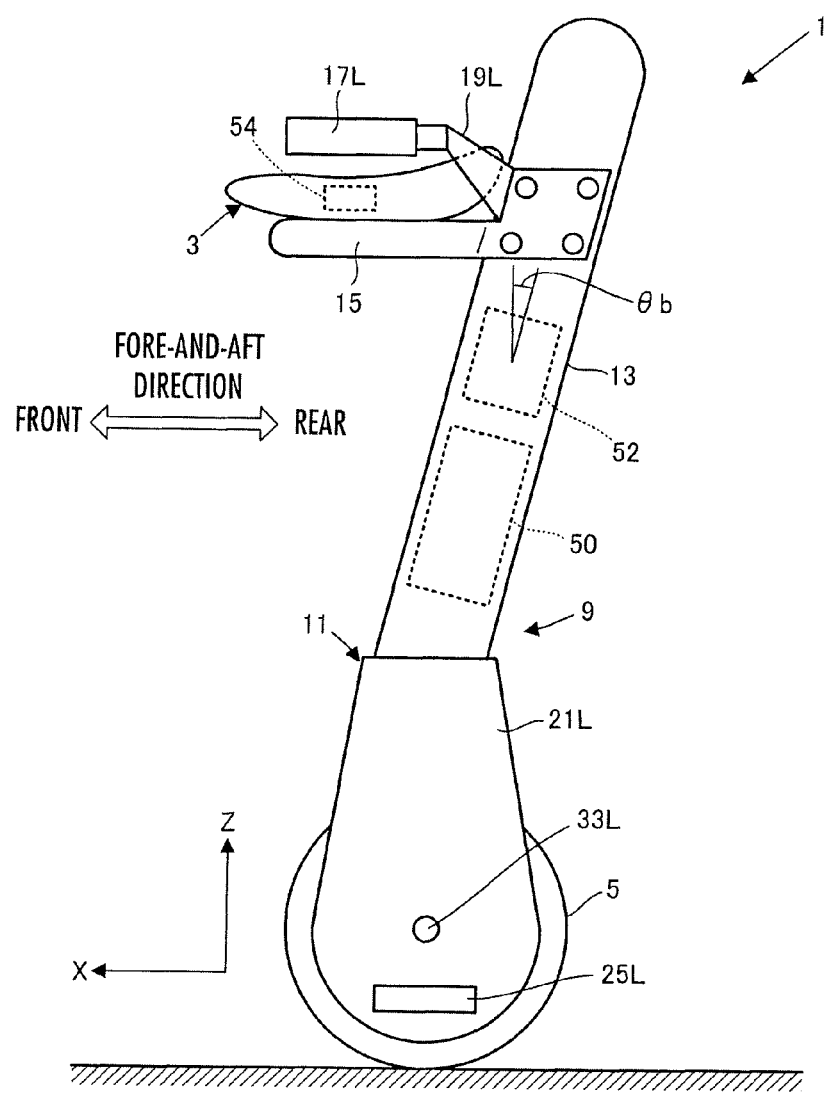
FIG. 2 is a side view of the inverted pendulum type vehicle according to the embodiment.

As illustrated in FIG. 1 and FIG. 2, an inverted pendulum type vehicle 1 in the present embodiment includes a payload supporting part 3 for an occupant (driver), a traveling motion unit 5 capable of traveling in all directions (two-dimensional all directions, including a fore-and-aft direction and a lateral direction) on a floor surface while being in contact with a floor surface, an actuator 7 which imparts, to the traveling motion unit 5, a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. Incidentally, "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side, respectively, of the vehicle 1.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for an occupant. Hence, the inverted pendulum type vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of patent document 2 mentioned above. Hence, in the description of the present embodiment, the aspects of the structures of the traveling motion unit 5 and the actuator 7 which are described in the aforesaid patent document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly 5 as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the aforesaid rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
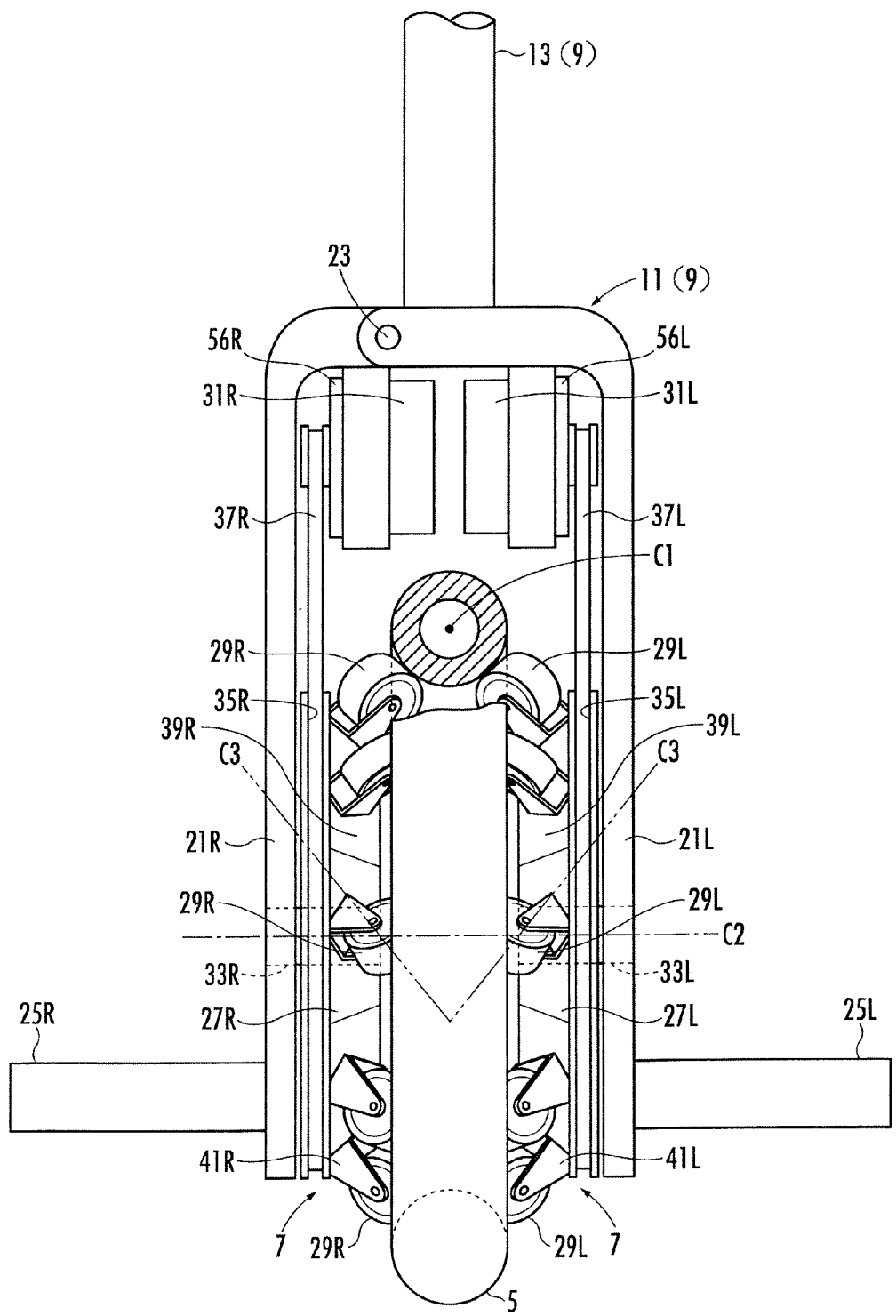
FIG. 3 is an enlarged view of a lower portion of the inverted pendulum type vehicle according to the embodiment.
Figure 4:
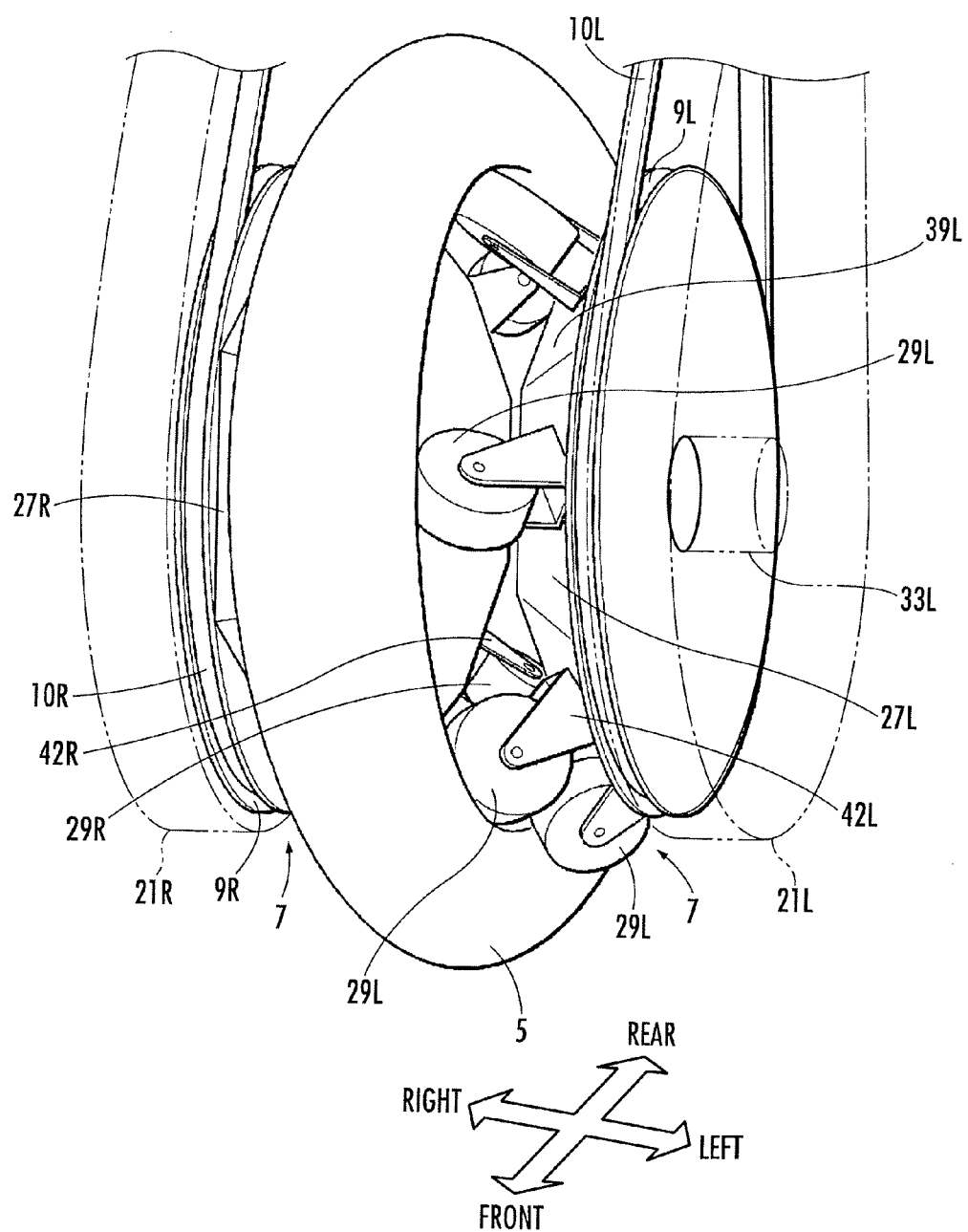
FIG. 4 is a perspective view of the lower portion of the inverted pendulum type vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

Incidentally, the aforesaid power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
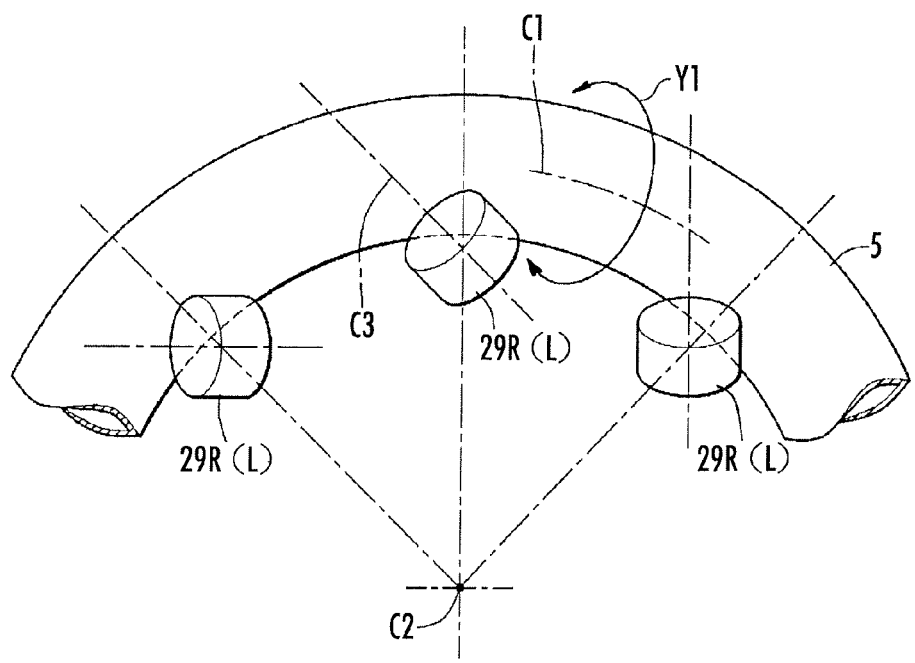
FIG. 6 is a diagram illustrating the placement relationship between the traveling motion unit (wheel unit) and free rollers of the inverted pendulum type vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the aforesaid postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the aforesaid rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 is effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

Incidentally, the seat (the payload supporting part) 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, when starting the vehicle 1 and the like, if, for example, an occupant kicks a floor with his/her foot as necessary thereby to apply a propulsive force (a propulsive force produced by the force of friction between the foot of the occupant and the floor) for increasing the traveling velocity of the vehicle 1 as an additional external force in addition to the propulsive force supplied by the actuator 7 to the vehicle 1, then the traveling motion of the wheel assembly 5 is controlled such that the traveling velocity of the vehicle 1 (more precisely, the moving velocity of the overall center-of-gravity point of the occupant and the vehicle) increases accordingly.

Further, in a state wherein no occupant is aboard the vehicle 1, the posture of the base body 9 in a state in which the center-of-gravity point of the vehicle 1 alone is positioned substantially right above the central point of the wheel assembly 5 (the central point on the axial center C2) (in a state wherein the center-of-gravity point is positioned substantially right above the ground contact surface of the wheel assembly 5) is defined as a desired posture, and the traveling motion of the wheel assembly 5 is controlled such that the actual posture of the base body 9 is converged to the desired posture, and consequently, the vehicle 1 stands autonomously without the base body 9 falling from tilting.

Further, in either state of the state where the occupant is aboard the vehicle 1 and the state where the occupant is not aboard the vehicle 1, the traveling motion of the wheel assembly 5 is controlled so that the moving velocity of the vehicle 1 increases as the deviation of the actual posture of the base body 9 from the desired posture increases, and the traveling of the vehicle 1 stops in the state where the actual posture of the base body 9 coincides with the desired posture.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

According to the present embodiment, in order to control the operation of the vehicle 1 as described above, a control unit 50 composed of an electronic circuit unit which mainly includes a microcomputer and a drive circuit unit for the electric motors 31R and 31L, a tilt sensor 52 for measuring a tilt angle θb relative to the vertical direction (the gravitational direction) of a predetermined portion of the base body 9 and a changing velocity thereof (=dθb/dt) as state amounts related to the posture of the base body 9 (or the posture of the seat 3), a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L. The rotary encoders 56R and 56L may alternatively be attached to the rotating members 27R and 27L, respectively.

More specifically, the aforesaid tilt sensor 52 is composed of an acceleration sensor and a rate sensor (angular velocity sensor), such as a gyro sensor, and outputs detection signals of these sensors to the control unit 50. Then, the control unit 50 carries out predetermined measurement arithmetic processing (this may be publicly known arithmetic processing) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, to be more specific, the tilt angle θb to be measured (hereinafter referred to a base body tilt angle θb in some cases) is composed of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is composed of a component in the direction about the Y-axis (the pitch direction) θbdot_x (=dθb_x/dt) and a component in the direction about the X-axis (the roll direction) θbdot_y (=dθb_y/dt).

Supplementally, according to the present embodiment, the seat 3 tilts integrally with the support frame 13 of the base body 9, so that the base body tilt angle θb also has a meaning as the tilt angle of the payload supporting part 3.

In the description of the present embodiment, regarding variables, such as a motional state amount having components in directions of the X-axis and the Y-axis, such as the aforesaid base body tilt angle θb (or directions about each axes), or variables, such as coefficients related to the motional state amount, the reference characters of the variables will be accompanied by a suffix "_x" or "_y" to distinguishably denote the components.

In this case, for the variables related to translational motions, such as a translational velocity, a component in the X-axis direction thereof will be accompanied by the suffix "_x" and a component in the Y-axis direction thereof will be accompanied by the suffix "_y."

Meanwhile, regarding the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference character of the variable. For example, to express the aforesaid base body tilt angle θb in the form of the pair of a component in the direction about the Y-axis θb_x and a component in the direction about the X-axis θb_y, the pair will be denoted by "the base body tilt angle θb_xy."

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predetermined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 carries out predetermined arithmetic processing by using the aforesaid measured values thereby to determine velocity commands, which are the desired values of the rotational angular velocities of the electric motors 31R and 31L, respectively, and carries out feedback control on the rotational angular velocity of each of the electric motors 31R and 31L according to the determined velocity commands.

Incidentally, the rotational angular velocity of the output shaft of the electric motor 31R and the rotational angular velocity of the rotating member 27R have a proportional relationship based on the speed reduction ratio of a fixed value between the output shaft and the rotating member 27R. Hence, for the sake of convenience, in the description of the present embodiment, the rotational angular velocity of the electric motor 31R may be used to express the rotational angular velocity of the rotating member 27R. Similarly, the rotational angular velocity of the electric motor 31L may be used to express the rotational angular velocity of the rotating member 27L.

The following will describe in more detail the control processing carried out by the control unit 50.

Figure 7:
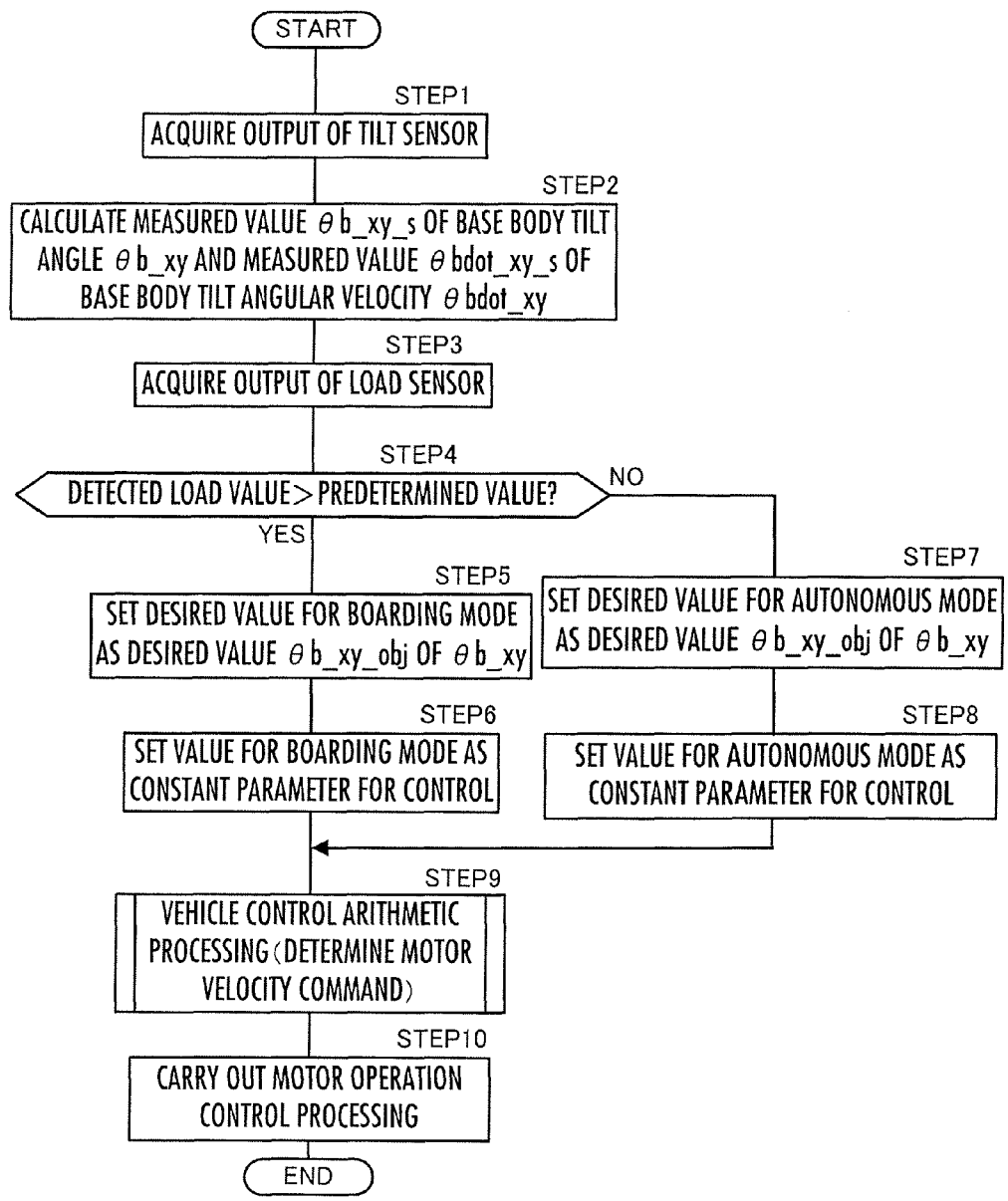
FIG. 7 is a flowchart illustrating the processing by a control unit of the inverted pendulum type vehicle according to the embodiment.

The control unit 50 executes the processing (main routine processing) illustrated by the flowchart of FIG. 7 at a predetermined control processing cycle.

First, in STEP1, the control unit 50 acquires an output of a tilt sensor 52.

Subsequently, the control unit 50 proceeds to STEP2 to calculate a measured value θb_xy_s of a base body tilt angle θb and a measured value θbdot_xy_s of a base body tilt angular velocity θbdot on the basis of the acquired output of the tilt sensor 52.

In the following description, to denote the observed value (the measured value or an estimated value) of an actual value of a variable (a state amount), such as the aforesaid measured value θb_xy_s, by a reference character, the reference character of the variable will have a suffix "_s".

Next, after acquiring an output of a load sensor 54 in STEP3, the control unit 50 carries out the determination processing in STEP4. In the determination processing, the control unit 50 determines whether or not the vehicle 1 has an occupant aboard (whether or not an occupant is sitting on the seat 3) by determining whether or not the load measured value indicated by the acquired output of the load sensor 54 is larger than a predetermined value which has been set beforehand.

Then, if the determination result in STEP4 is affirmative, then the control unit 50 carries out the processing for setting a desired value θb_xy_obj of the base body tilt angle θb and the processing for setting the values of constant parameters (e.g., the basic values of various gains) for controlling the operation of the vehicle 1 in STEP5 and STEP6, respectively.

In STEP5, the control unit 50 sets a predetermined desired value for a boarding mode as the desired value θb_xy_obj of the base body tilt angle θb.

Here, the term "boarding mode" means the operation mode of the vehicle 1 in the case where the occupant is aboard the vehicle 1. The desired value θb_xy_obj for the boarding mode is preset such that desired value θb_xy_obj coincides or substantially coincides with the measured value θb_xy_s of the base body tilt angle θb measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Further, in STEP6, the control unit 50 sets predetermined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

Meanwhile, if the determination result in STEP4 is negative, then the control unit 50 carries out the processing for setting a desired value θb_xy_obj of a base body tilt angle θb_xy and the processing for setting the values of constant parameters for controlling the operation of the vehicle 1 in STEP7 and STEP8, respectively.

In STEP7, the control unit 50 sets a predetermined desired value for an autonomous mode as the desired value θb_xy_obj of the base body tilt angle θb.

Here, the term "autonomous mode" means an operation mode of the vehicle 1 in the case where the occupant is not aboard the vehicle 1. The desired value θb_xy_obj for the autonomous mode is preset such that desired value θb_xy_obj coincides or substantially coincides with the measured value θb_xy_s of the base body tilt angle θb measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value θb_xy_obj for the autonomous mode is generally different from the desired value θb_xy_obj for the boarding mode.

Further, in STEP8, the control unit 50 sets predetermined values for the autonomous mode as the values of constant parameters for controlling the operation of the vehicle 1. The values of the constant parameters for the autonomous mode are different from the values of the constant parameters for the boarding mode.

The aforesaid values of the constant parameters are set to be different between the boarding mode and the autonomous mode, because the response characteristics of the operations of the vehicle 1 relative to control inputs are different from each other due to the differences in the height of the aforesaid center-of-gravity point, the overall mass, and the like between the respective modes.

By the processing in STEP4 to STEP8 described above, the desired value θb_xy_obj of the base body tilt angle θb_xy and the values of the constant parameters are set for each of the operational modes, namely, the boarding mode and the autonomous mode.

Incidentally, the processing in STEP5 and STEP6 or the processing in STEP7 and STEP8 is not essential to carry out for each control processing cycle. Alternatively, the processing may be carried out only when the determination result in STEP4 changes.

Supplementally, in both the boarding mode and the autonomous mode, the desired value of a component θbdot_x in the direction about a Y-axis of the base body tilt angular velocity θbdot and the desired value of a component θbdot_y in the direction about an X-axis thereof are both 0. For this reason, it is unnecessary to carry out the processing for setting a desired value of the base body tilt angular velocity θbdot_xy.

After carrying out the processing in STEP5 and STEP6 or the processing in STEP7 and STEP8 as described above, the control unit 50 carries out vehicle control arithmetic processing in STEP9 thereby to determine the speed commands for electric motors 31R and 31L, respectively. The vehicle control arithmetic processing will be discussed later in detail.

Subsequently, the control unit 50 proceeds to STEP10 to carry out the processing for controlling the operations of the electric motors 31R and 31L according to the speed commands determined in STEP9. In this operation control processing, based on the difference between the speed command for the electric motor 31R determined in STEP9 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control processing carried out by the control unit 50.

The vehicle control arithmetic processing in STEP9 mentioned above will now be described in detail.

In the following description, the vehicle-occupant overall center-of-gravity point in the boarding mode and the vehicle-alone center-of-gravity point in the autonomous mode will be generically referred to as the vehicle system center-of-gravity point. The vehicle system center-of-gravity point will mean the vehicle-occupant overall center-of-gravity point when the operational mode of the vehicle 1 is the boarding mode and will mean the vehicle-alone center-of-gravity point when the operational mode of the vehicle 1 is the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value will mean a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
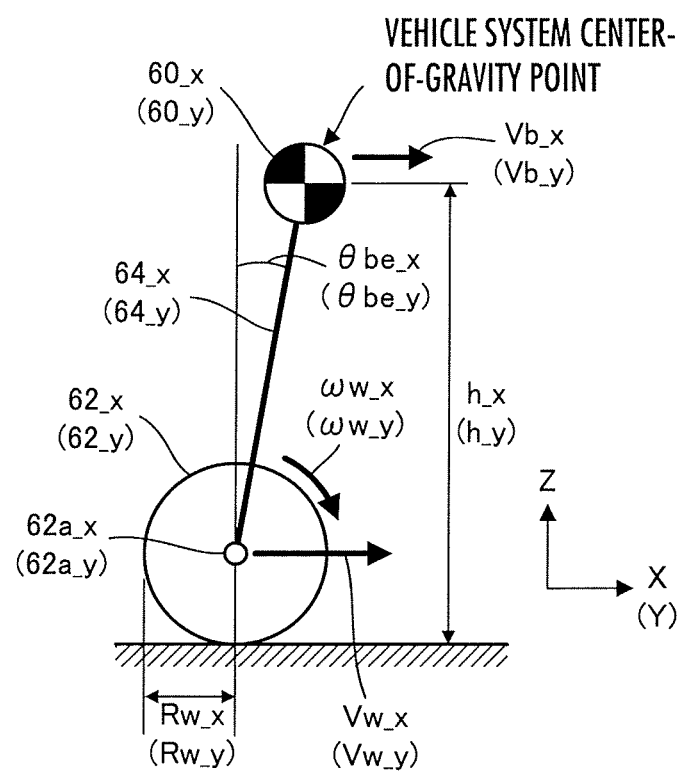
FIG. 8 is a diagram illustrating an inverted pendulum model expressing the dynamic behaviors of the inverted pendulum type vehicle according to the embodiment.

In the present embodiment, the vehicle control arithmetic processing in STEP9 is carried out, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, unparenthesized reference numerals denote the reference numerals associated with the inverted pendulum model observed from the Y-axis direction, while the parenthesized reference numerals denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as the supporting point.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the parenthesized reference numerals in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predetermined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x=(\omega\_R+\omega\_L)/2 \quad \text{Expression 01a}$$

$$\omega w\_y=C\cdot(\omega\_R-\omega\_L)/2 \quad \text{Expression 01b}$$

where "C" in expression 01b denotes a coefficient of a predetermined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

Here, the dynamics of the inverted pendulum model shown in FIG. 8 is represented by expressions 03x and 03y given below. Expression 03x is an expression that represents the dynamics of the inverted pendulum model observed from the Y-axis direction, while expression 03y is an expression that represents the dynamics of the inverted pendulum model observed from the X-axis direction.

$$d^2\theta be\_x/dt^2=\alpha\_x\cdot\theta be\_x+\beta\_x\cdot\omega dot\_x \quad \text{Expression 03x}$$

$$d^2\theta be\_y/dt^2=\alpha\_y\cdot\theta be\_y+\beta\_y\cdot\omega dot\_y \quad \text{Expression 03y}$$

where ωwdot_x in expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in expression 03y.

As may be understood from these expressions 03x and 03y, the motions of the mass points 60_x and 60_y of the inverted pendulum model (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic processing in STEP9, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Supplementally, of the imaginary wheel rotational angular acceleration commands ωwdot_x_cmd, ωwdot_y_cmd as the manipulation variable (control input) in the present embodiment, ωwdot_x_cmd is a rotational angular velocity acceleration of the virtual wheel 62_x traveling in the X-axis direction, so that the same functions as the manipulated variable for regulating the driving force to be applied to the wheel assembly 5 for moving the wheel assembly 5 in the X-axis direction. Further, ωwdot_y_cmd is a rotational angular acceleration of the virtual wheel 62_y traveling in the Y-axis direction, so that the same functions as the manipulated variable for regulating the driving force to be applied to the wheel assembly 5 for moving the wheel assembly 5 in the Y-axis direction.

Figure 9:
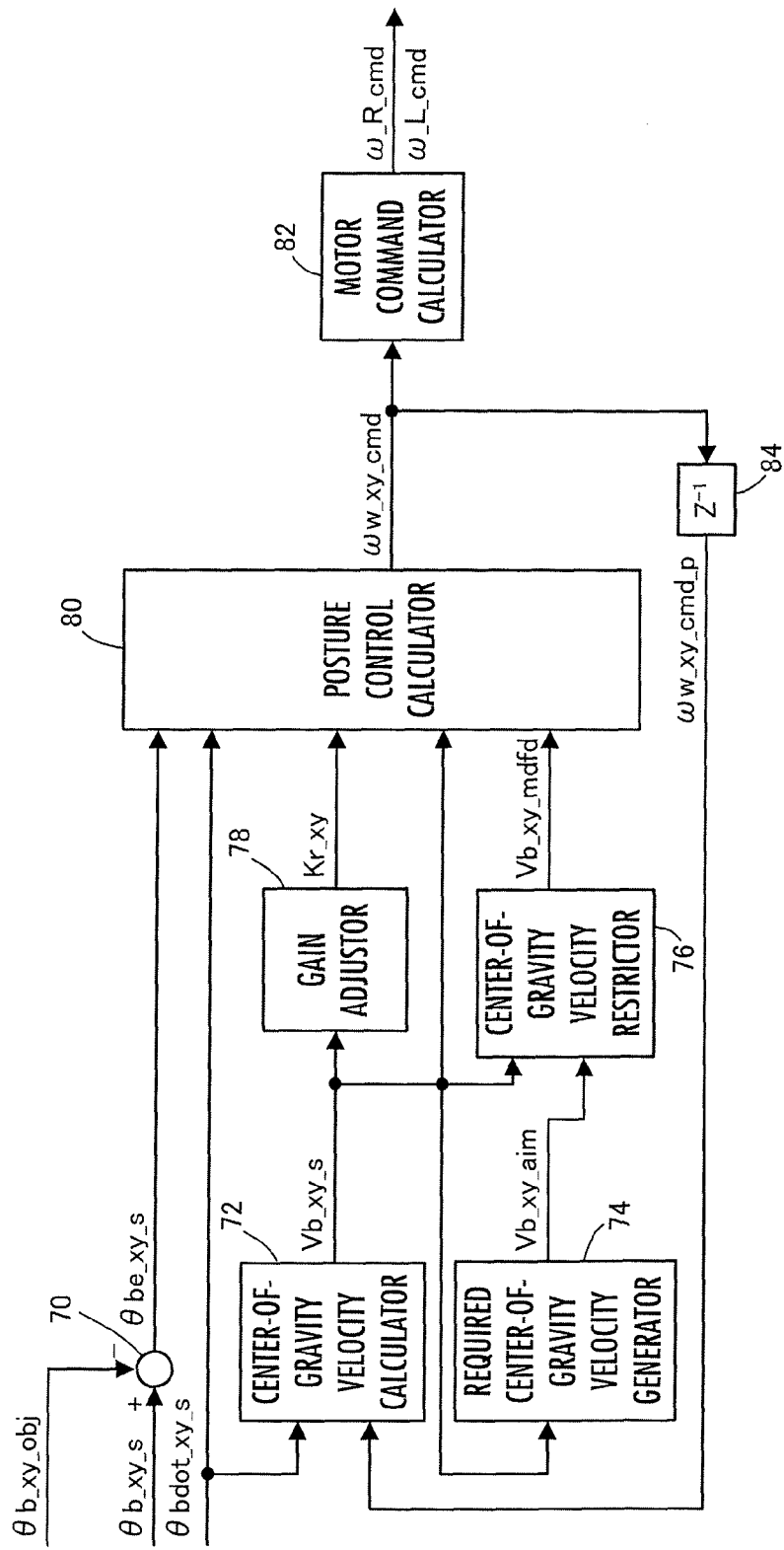
FIG. 9 is a block diagram illustrating a processing function related to the processing in STEP9 of FIG. 7.

The control unit 50 is provided with the functions illustrated in the block diagram of FIG. 9 as the functions for carrying out the vehicle control arithmetic processing in STEP9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a required center-of-gravity velocity generator 74 which generates a required center-of-gravity velocity V_xy_aim as the required value of the center-of-gravity velocity Vb_xy presumably required by a steering operation of the vehicle 1 (an operation for adding a propulsion force to the vehicle 1) by an occupant or the like, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L from the aforesaid estimated center-of-gravity velocity value Vb_xy_s and the required center-of-gravity velocity V_xy_aim, and a gain adjustor 78 which determines a gain adjustment parameter Kr_xy for adjusting the values of the gain coefficients of expressions 07x and 07y, which will be discussed later.

The control unit 50 is further provided with a posture control calculator 80 which calculates the imaginary wheel rotational angular velocity command ωw_xy_cmd, and a motor command calculator 82 which converts the imaginary wheel rotational angular velocity command ωw_xy_cmd into a pair of a velocity command ω_R_cmd (a command value of a rotational angular velocity) for the right electric motor 31R and a velocity command ω_Lcmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by the posture control calculator 80. The delay element 84 outputs a previous value ωw_xy_cmd_p of the imaginary wheel rotational angular velocity command ωw_xy_cmd at each control processing cycle.

In the vehicle control arithmetic processing in STEP9 described above, the processing by the aforesaid processing sections is carried out as described below.

The control unit 50 first carries out the processing by the error calculator 70 and the processing by the center-of-gravity velocity calculator 72.

The error calculator 70 receives the base body tilt angle measured values θb_xy_s (θb_x_s and θb_y_s) calculated in the aforesaid STEP2 and the desired values θb_xy_obj (θb_x_obj and θb_y_obj) set in the aforesaid STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The processing by the error calculator 70 may be carried out before the vehicle control arithmetic processing in STEP9. For example, the processing by the error calculator 70 may be carried out during the processing in the aforesaid STEP5 or STEP7.

The center-of-gravity velocity calculator 72 receives the current value of the base body tilt angular velocity measured values θbdot_xy_s (θbdot_x_s and θbdot_y_s) calculated in the aforesaid STEP2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predetermined arithmetic expression based on the aforesaid inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \quad \quad 05x$$

$$Vb\_y\_s = Rw\_y \cdot \omega w\_y\_cmd\_p + h\_y \cdot \theta bdot\_y\_s \quad \quad 05y$$

In these expressions 05x and 05y, Rw_x and Rw_y denote the radii of the imaginary wheels 62_x and 62_y, respectively, as described above, and the values thereof are predetermined values set beforehand. Further, reference characters h_x and by denote the heights of the mass points 60_x and 60_y, respectively, of the inverted pendulum model. In this case, according to the present embodiment, the height of the vehicle system center-of-gravity point is maintained to be substantially constant. Thus, predetermined values set beforehand are used as the values of h_x and h_y, respectively. Supplementally, the heights h_x and h_y are included in the constant parameters for setting the values in the aforesaid STEP6 or STEP8.

The first term of the right side of expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 carries out the processing by the required center-of-gravity velocity generator 74 and the processing by the gain adjustor 78. In this case, the required center-of-gravity velocity generator 74 and the gain adjustor 78 respectively receive the estimated center-of-gravity velocity values Vb_xy_s (Vb_x_s and Vb_y_s) calculated by the center-of-gravity velocity calculator 72 as described above.

Then, the required center-of-gravity velocity generator 74 determines the required center-of-gravity velocities V_xy_aim (V_x_aim, V_y_aim) on the basis of the input estimated center-of-gravity velocity values Vb_xy_s (Vb_x_s and Vb_y_s) when the operation mode of the vehicle 1 is the boarding mode. This will be discussed in detail later. In the present embodiment, if the operation mode of the vehicle 1 is the autonomous mode, then the required centerof-gravity velocity generator 74 sets both required center-of-gravity velocities V_x_aim and V_y_aim to 0.

Further, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The processing by the gain adjustor 78 will be described below with reference to FIG. 10 and FIG. 11.

Figure 10:
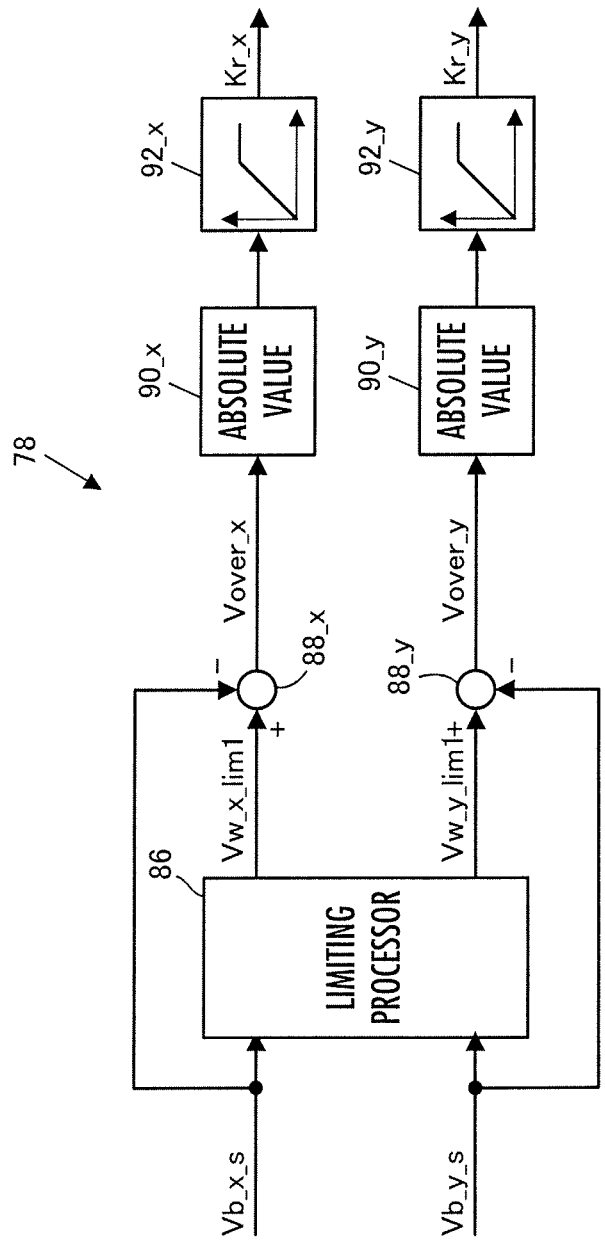
FIG. 10 is a block diagram illustrating a processing function of a gain adjusting element shown in FIG. 9.
Figure 11:
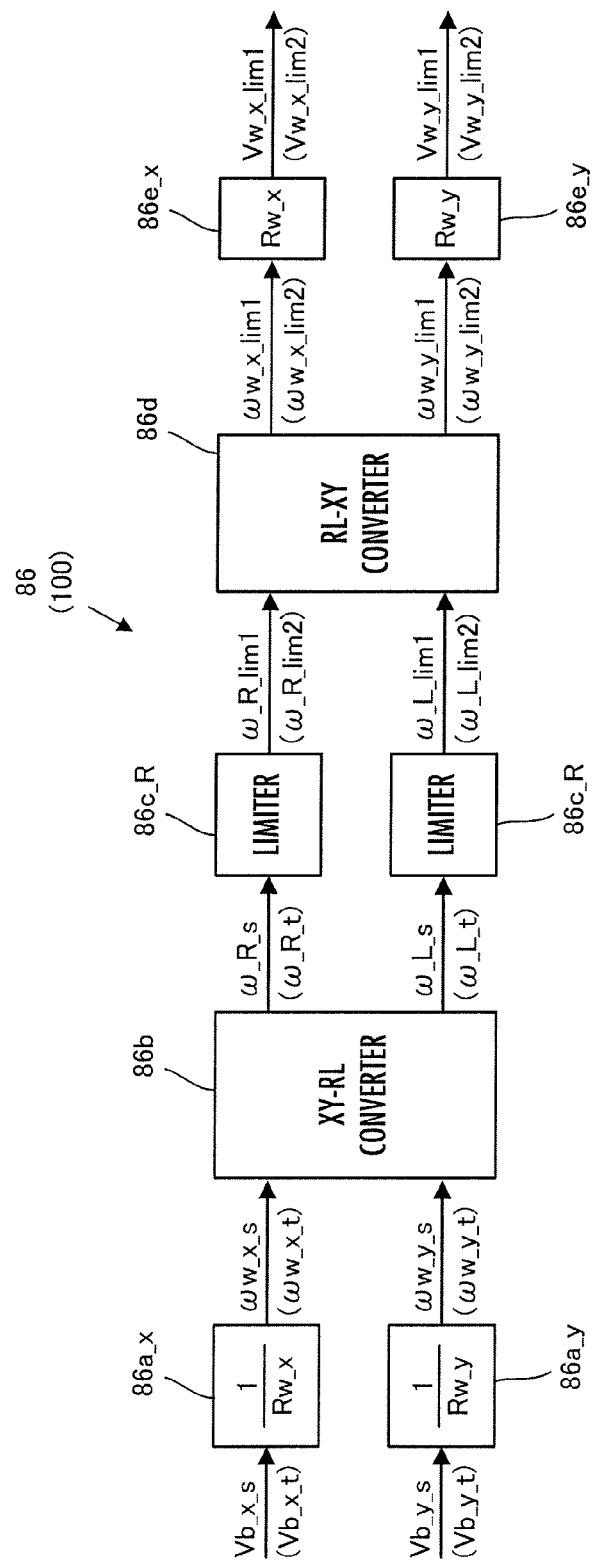
FIG. 11 is a block diagram illustrating a processing function of a limiting processor shown in FIG. 10 (or a limiting processor shown in FIG. 12)

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 means a value obtained after limiting the moving velocity Vw_x of the imaginary wheel 62_x in the X-axis direction and the output value Vw_y_lim1 means a value obtained after limiting the moving velocity Vw_y of the imaginary wheel 62_y in the Y-axis direction.

The processing by the limiting processor 86 will be described in further detail with reference to FIG. 11. The parenthesized reference characters in FIG. 11 denote the processing by a limiting processor 104 of the center-of-gravity velocity restrictor 76, which will be discussed later, and may be ignored in the description related to the processing by the limiting processor 86.

The limiting processor 86 first supplies the estimated center-of-gravity velocity values Vb_x_s and Vb_y_s to processors 86$a$_x and 86$a$_y, respectively. The processor 86$a$_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86$a$_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and ωw_y_s into a pair of the rotational angular velocity ω_R_s of the electric motor 31R and the rotational angular velocity ω_L_s of the electric motor 31L by an XY-RL converter 86$b$.

According to the present embodiment, the conversion is implemented by solving a simultaneous equation obtained by replacing ωw_x, ωw_y, ω_R and ω_L of the aforesaid expressions 01a and 01b by ωw_x_s, ωw_y_s, ω_R_s and ω_L_s, respectively, taking the ω_R_s and ω_L_s as unknowns.

Subsequently, the limit processor 86 supplies the output values ω_R_s and ω_L_s of the XY-RL converter 86$b$ to limiters 86$c$_R and 86$c$_L, respectively. At this time, the limiter 86$c$_R directly outputs the ω_R_s as an output value ω_R_lim1 if the ω_R_s falls within the permissible range for the right motor, which has an upper limit value (>0) and a lower limit value (<0) of predetermined values set beforehand. If the ω_R_s deviates from the permissible range for the right motor, then the limiter 86$c$_R outputs, as the output value ω_R_lim1, a boundary value of the upper limit value or the lower limit value of the permissible range for the right motor whichever is closer to the ω_R_s. Thus, the output value ω_R_lim1 of the limiter 86$c$_R is limited to a value within the permissible range for the right motor.

Similarly, the limiter 86$c$_L directly outputs the ω_L_s as an output value ω_L_lim1 if the ω_L_s falls within the permissible range for the left motor, which has an upper limit value (>0) and a lower limit value (<0) of predetermined values set beforehand. If the ω_L_s deviates from the permissible range for the left motor, then the limiter 86$c$_L outputs, as the output value ω_L_lim1, a boundary value of the upper limit value or the lower limit value of the permissible range for the left motor whichever is closer to the ω_L_s. Thus, the output value ω_L_lim1 of the limiter 86$c$_L is limited to a value within the permissible range for the left motor.

The permissible range for the right motor described above is a permissible range which has been set so as to prevent the rotational angular velocity (absolute value) of the right electric motor 31R from becoming excessively high thereby to prevent the maximum value of the torque that can be output by the electric motor 31R from decreasing. This applies also to the permissible range for the left motor.

Subsequently, the limit processor 86 converts the pair of the output values ω_R_lim1 and ω_L_lim1 of the limiters 86$c$_R and 86$c$_L, respectively, into a pair of the rotational angular velocities ωw_x_lim1 and ωw_y_lim1 of the imaginary wheels 62_x and 62_y, respectively, by an RL-XY converter 86$d$.

The conversion is the processing of the inverse conversion of the processing of the conversion by the aforesaid XY-RL converter 86$b$. This processing is implemented by solving a simultaneous equation obtained by replacing ωw_x, ωw_y, ω_R and ω_L of the aforesaid expressions 01a and 01b by ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86$d$ to processors 86$e$_x and 86$e$_y, respectively. The processor 86$e$_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86$e$_y converts ωw_y_lim1 into the moving velocity Vw_y_lim1 of the imaginary wheel 62_y (=ωw_y_lim1·Rw_y).

If it is assumed that the processing by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then carries out the processing by calculators 88_x and 88_y. The calculator 88_x receives the estimated center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

In this case, if the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both 0.

Meanwhile, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1−Vb_x_s) and a corrected amount from Vb_y_s of Vw_y_lim1 (=Vw_y_lim1−Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic is a characteristic in which a change amount of an output value relative to an increase in an input value becomes 0 or approaches to 0 when the input value increases to a certain level.

In this case, according to the present embodiment, if the input value |Vover_x| is a preset, predetermined value or less, then the processor 92_x outputs, as Kr_x, a value obtained by multiplying the input value |Vover_x| by a proportionality coefficient of a predetermined value. Further, if the input value |Vover_x| is larger than the predetermined value, then the processor 92_x outputs 1 as Kr_x. Incidentally, the proportionality coefficient is set such that the product of |Vover_x| and the proportionality coefficient becomes 1 when |Vover_x| agrees with a predetermined value.

The processing by processors 90_y and 92_y is the same as that carried out by the processors 90_x and 92_x, respectively, described above.

If the output values Vw_x_lim1 and Vw_y_lim1 in the limiting processor 86 are not forcibly restricted by the processing carried out by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be 0.

Meanwhile, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the aforesaid corrected amounts Vover_x and Vover_y, respectively. In this case, Kr_x is determined to be a larger value as the absolute value of the corrected amount Vover_x increases, the upper limit value thereof being 1. The same applies to Kr_y.

Returning to the description of FIG. 9, after carrying out the processing by the center-of-gravity velocity calculator 72 and the required center-of-gravity velocity generator 74 as described above, the control unit 50 then carries out the processing by the center-of-gravity velocity restrictor 76.

The center-of-gravity velocity restrictor 76 receives the estimated center-of-gravity velocities Vb_xy_s (Vb_x_s and Vb_y_s) calculated by the center-of-gravity velocity calculator 72 and the required center-of-gravity velocities Vb_xy_aim (Vb_x_aim and Vb_y_aim) determined by the required center-of-gravity velocity generator 74. Then, the center-of-gravity velocity restrictor 76 carries out the processing illustrated by the block diagram of FIG. 12 by using the above input values so as to determine desired center-of-gravity velocities for control Vb_xy_mdfd (Vb_x_mdfd and Vb_y_mdfd).

To be more specific, the center-of-gravity velocity restrictor 76 first carries out the processing by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x. The proportional-differential compensation component 94a_x is a compensation component whose transfer function is denoted by 1+Kd·S, and adds the input Vb_x_s and the value obtained by multiplying the differential value thereof (temporal change rate) by a coefficient Kd of a predetermined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94a_x, then supplies the output value of the calculator 94b_x to a low-pass filter 94c_x having a phase compensation function. The low-pass filter 94c_x is a filter whose transfer function is denoted by (1+T2·S)/(1+T1·S). Then, the stead-state error calculator 94_x outputs the output value Vb_x_prd of the low-pass filter 94c_x.

Further, the stead-state error calculator 94_y receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element 96_y.

Then, as with the stead-state error calculator 94_x described above, the stead-state error calculator 94_y carries out the processing by a proportional-differential compensation component 94a_y, a calculator 94b_y, and a low-pass filter 94c_y in order and outputs an output value Vb_y_prd of the low-pass filter 94c_y.

Here, the output value Vb_x_prd of the stead-state error calculator 94_x has a meaning as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y has a meaning as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the expected center-of-gravity velocity stead-state error values.

After carrying out the processing by the stead-state error calculators 94_x and 94_y as described above, the center-of-gravity velocity restrictor 76 carries out the processing for adding the desired center-of-gravity velocity Vb_x_aim to the output value Vb_x_prd of the stead-state error calculator 94_x and the processing for adding the desired center-of-gravity velocity Vb_y_aim to the output value Vb_y_prd of the stead-state error calculator 94_y by calculators 98_x and 98_y, respectively.

Therefore, an output value Vb_x_t of the calculator 98_x will indicate the velocity obtained by adding the desired center-of-gravity velocity Vb_x_aim in the X-axis direction to the expected center-of-gravity velocity stead-state error value in the X-axis direction Vb_x_prd. Similarly, an output value Vb_y_t of the calculator 98_y will indicate the velocity obtained by adding the desired center-of-gravity velocity Vb_y_aim in the Y-axis direction to the expected center-of-gravity velocity stead-state error value in the Y-axis direction Vb_y_prd.

If the required center-of-gravity velocity in the X-axis direction Vb_x_aim is 0, as in the case where, for example, the operation mode of the vehicle 1 is the autonomous mode, then the expected center-of-gravity velocity stead-state error value in the X-axis direction Vb_x_prd is directly provided as the output value Vb_x_t of the calculator 98_x. Similarly, if the required center-of-gravity velocity in the Y-axis direction Vb_y_aim is 0, then the expected center-of-gravity velocity stead-state error value in the Y-axis direction Vb_y_prd is directly provided as the output value Vb_y_t of the calculator 98_y.

Subsequently, the center-of-gravity velocity restrictor 76 supplies the output values Vb_x_t and Vb_y_t of the calculators 98_x and 98_y, respectively, to a limiting processor 100. The processing by the limiting processor 100 is the same as the processing by the limiting processor 86 of the gain adjustor 78 described above. In this case, as indicated by the parenthesized reference characters in FIG. 11, only the input values and the output values of the individual processing sections of the limiting processor 100 are different from those of the limiting processor 86.

To be more specific, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_t and Vb_y_t, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Further, these rotational angular velocities ω_R_t and ω_L_t are limited to values within the permissible range for the right motor and the permissible range for the left motor, respectively, by limiters 86c_R and 86c_L. Then, the values ω_R_lim2 and ω_L_lim2, which have been subjected to the limitation processing, are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding to the rotational angular velocities ωw_x_lim2 and ωw_y_lim2 are calculated by the processors 86e_x and 86e_y, respectively, and these moving velocities Vw_x_lim2 and Vw_y_lim2 are output from the limiting processor 100.

By carrying out the processing by the limiting processor 100 described above, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges, as with the limiting processor 86.

Incidentally, the permissible ranges for the right motor and left motor in the limiting processor 100 do not have to be the same as the permissible ranges in the limiting processor 86, and may be set to be permissible ranges that are different from each other.

Regarding the desired center-of-gravity velocities for control Vb_x_mdfd and Vb_y_mdfd determined as described above, in the case where the output values Vw_x_lim2 and Vw_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the output value Vb_x_t of the calculator 98_x and Vb_y_t of the calculator 98_y, respectively, the required center-of-gravity velocities Vb_x_aim and Vb_y_aim will be directly determined as the desired center-of-gravity velocities for control Vb_x_mdfd and Vb_y_mdfd, respectively.

Regarding the desired center-of-gravity velocities for control Vb_x_mdfd and Vb_y_mdfd determined as described above, in the case where the output values V_x_lim2 and V_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the output value Vb_x_t of the calculator 98_x and Vb_y_t of the calculator 98_y, respectively, the required center-of-gravity velocities Vb_x_aim and Vb_y_aim will be directly determined as the desired center-of-gravity velocities for control Vb_x_mdfd and Vb_y_mdfd, respectively.

In this case, if the required center-of-gravity velocity in the X-axis direction Vb_x_aim is 0, then the desired center-of-gravity velocity for control in the X-axis direction Vb_x_mdfd will be also 0, and if the required center-of-gravity velocity in the Y-axis direction Vb_y_aim is 0, then the desired center-of-gravity velocity for control in the Y-axis direction Vb_y_mdfd will be also 0.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the output value Vb_x_t of the calculator 98_x and the output value Vb_y_t of the calculator 98_y, then for the X-axis direction, a value obtained by correcting the desired center-of-gravity velocity Vb_x_aim by a correction amount from the input value Vb_x_t of the output value Vw_x_lim2 of the limiting processor 100 (=Vw_x_lim2−Vb_x_t) (a value obtained by adding the correction amount to Vb_x_aim) is determined as the desired center-of-gravity velocity for control in the X-axis direction Vb_x_mdfd.

Further, regarding the Y-axis direction, a value obtained by correcting the desired center-of-gravity velocity Vb_y_aim by a correction amount from the input value Vb_y_t of the output value Vw_y_lim2 of the limiting processor 100 (=Vw_y_lim2−Vb_y_t) (a value obtained by adding the correction amount to Vb_y_aim) is determined as the desired center-of-gravity velocity for control in the Y-axis direction Vb_y_mdfd.

In this case, if the desired center-of-gravity velocity Vb_x_aim on, for example, the velocity in the X-axis direction is not 0, then the desired center-of-gravity velocity for control Vb_x_mdfd approaches to 0 more than the desired center-of-gravity velocity Vb_x_aim or becomes a velocity in the opposite direction from the desired center-of-gravity velocity Vb_x_aim. Further, if the desired center-of-gravity velocity Vb_x_aim is 0, then the desired center-of-gravity velocity for control Vb_x_mdfd becomes a velocity in the opposite direction from the expected center-of-gravity velocity stead-state error value in the X-axis direction Vb_x_prd output by the stead-state error calculator 94_x. The same applies to the velocity in the Y-axis direction.

The above has described the processing by the center-of-gravity velocity restrictor 76.

Returning to the description of FIG. 9, after carrying out the processing by the center-of-gravity velocity calculator 72, the center-of-gravity velocity restrictor 76, the gain adjustor 78, and the error calculator 70 as described above, the control unit 50 carries out the processing by the posture control calculator 80.

Figure 13:
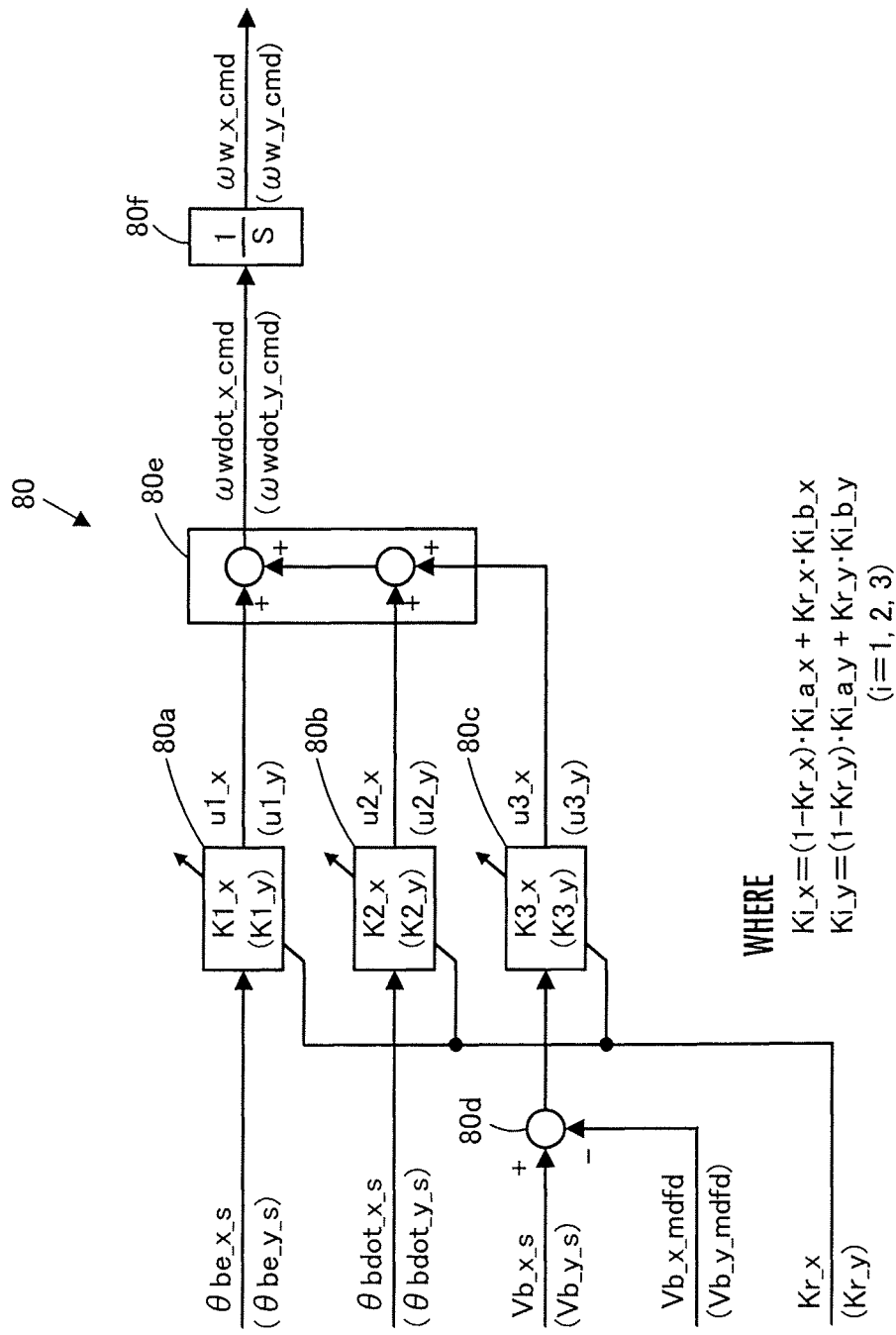
FIG. 13 is a block diagram illustrating a processing function of a posture control calculator 80 shown in FIG. 9.

The processing by the posture control calculator 80 will be described below by referring to FIG. 13. Incidentally, the unparenthesized reference characters in FIG. 13 are the reference characters related to the processing for determining the aforesaid imaginary wheel rotational angular velocity command ωw_x_cmd, which is the desired value of the rotational angular velocity of the imaginary wheel 62_x circumrotating in the X-axis direction. The parenthesized reference characters are the reference characters related to the processing for determining the aforesaid imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the aforesaid STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

$$\omega wdot\_x\_cmd = K1\_x \cdot \theta be\_x\_s + K2x \cdot \theta bdot\_x\_s + K3\_x \cdot (Vb\_x\_s - Vb\_x\_mdfd) \quad \text{Expression 07x}$$

$$\omega wdot\_y\_cmd = K1y \cdot \theta be\_y\_s + K2\_y \cdot \theta bdot\_y\_s + K3\_y \cdot (Vb\_y\_s - Vb\_y\_mdfd) \quad \text{Expression 07y}$$

Hence, according to the present embodiment, each imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

In this case, the gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in expression 07x and an i-th gain coefficient K1_y (i=1, 2, or 3) in expression 07y are determined on the basis of the gain adjustment parameters Kr_x and Kr_y according to expressions 09x and 09y given below, as indicated by the note in FIG. 13.

$$Ki\_x = (1 - Kr\_x) \cdot Ki\_a\_x + Kr\_x \cdot Ki\_b\_x \quad \text{Expression 09x}$$

$$Ki\_y = (1 - Kr\_y) \cdot Ki\_a\_y + Kr\_y \cdot Ki\_b\_y \quad \text{Expression 09y}$$

(i=1, 2, 3)

Here, Ki_a_x and Ki_b_x in expression 09x denote constant values set beforehand as the gain coefficient values on a minimum end (an end close to 0) of the i-th gain coefficient Ki_x and as the gain coefficient value on a maximum end (an end away from 0), respectively. The same applies to Ki_a_y and Ki_b_y in expression 09y.

Thus, each i-th gain coefficient Ki_x (i=1, 2 or 3) used in the calculation of expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches 1 from 0, the i-th gain coefficient Ki_x approaches Ki_b_x from Ki_a_x.

Similarly, each i-th gain coefficient Ki_y (i=1, 2 or 3) used in the calculation of expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

Supplementally, the aforesaid constant values Ki_a_x, Ki_b_x and Ki_a_y, Ki_b_y (i=1, 2 or 3) are included in the constant parameters, the values of which are set in the aforesaid STEP6 or STEP8.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More detailedly, referring to FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 carries out the calculation of the above expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

In this case, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80a and 80b, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80d, and calculates, by the processor 80c, a manipulated variable component u3_y obtained by multiplying the calculated difference by the third gain coefficient K3_y. Then, the posture control calculator 80 adds up these manipulated variable components u1_y, u2_y, and u3_y by the calculator 80e so as to calculate the imaginary wheel rotational angular acceleration command ωwdot_x_cmd.

Here, the first term (=the first manipulated variable component u1_x) and the second term (=the second manipulated variable component u2_x) of the right side of expression 07x mean the feedback manipulated variable components for converging the base body tilt angle error measured value θbe_x_s in the direction about the X-axis to 0 (converging the base body tilt angle measured value θb_x_s to the desired value θb_x_obj) by the PD law (proportional-differential law) serving as the feedback control law.

Further, the third term (=the third manipulated variable component u3_x) of the right side of expression 07x means a feedback manipulated variable component for converging the difference between the estimated center-of-gravity velocity value Vb_x_s and the desired center-of-gravity velocity for control Vb_x_mdfd to 0 (converging Vb_x_s to Vb_x_mdfd) by a proportional law serving as the feedback control law.

The same applies to the first to the third terms (the first to the third manipulated variable components u1_y, u2_y, and u3_y) of the right side of expression 07y.

After calculating the imaginary wheel rotational angular acceleration commands ωwdot_x_cmd and ωwdot_y_cmd as described above, the posture control calculator 80 integrates each of the ωwdot_x_cmd and ωwdot_y_cmd by an integrator 80f thereby to determine the aforesaid imaginary wheel rotational velocity commands ωw_x_cmd and ωw_y_cmd.

The above has described the details of the processing by the posture control calculator 80.

Supplementally, the imaginary wheel rotational angular acceleration command ωwdot_x_cmd may alternatively be calculated by an expression wherein the third term of the right side of expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωw_x_cmd and ωw_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of each imaginary wheels 62_x and 62_y (i.e., the frictional forces between the imaginary wheels 62_x, 62_y and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and carries out the processing by the motor command calculator 82 so as to determine a velocity command $\omega\_R\_cmd$ of the electric motor 31R and a velocity command $\omega\_L\_cmd$ of the electric motor 31L. The processing by the motor command calculator 82 is the same as the processing by the XY-RL converter 86$b$ of the aforesaid limiting processor 86 (refer to FIG. 11).

To be more specific, the motor command calculator 82 determines the velocity commands $\omega\_R\_cmd$ and $\omega\_L\_cmd$ of the electric motors 31R and 31L by a simultaneous equation obtained by replacing $\omega w\_x$, $\omega w\_y$, $\omega\_R$ and $\omega\_L$ of the aforesaid expressions 01a and 01b by $\omega w\_x\_cmd$, $\omega w\_y\_cmd$, $\omega\_R\_cmd$ and $\omega\_L\_cmd$, respectively, taking the $\omega\_R\_cmd$ and $\omega\_L\_cmd$ as unknowns.

Thus, the vehicle control arithmetic processing in the aforesaid STEP9 is completed.

By the control arithmetic processing carried out by the control unit 50 as described above, the imaginary wheel rotational angular acceleration commands $\omega dot\_xy\_cmd$ denoting the manipulated variables (control inputs) are determined such that, basically, the posture of the base body 9 is maintained at a posture in which the aforesaid base body tilt angle error measured value $\theta be\_x\_s$ and $\theta be\_y\_s$ are both 0 (hereinafter, this posture will be referred to as the basic posture), i.e., the position of the vehicle system center-of-gravity point (the vehicle-occupant overall center-of-gravity point or the vehicle-alone center-of-gravity point) is maintained to be substantially right above the ground contact surface of the wheel assembly 5, in the operation modes of both the boarding mode and the autonomous mode. More detailedly, the imaginary wheel rotational angular acceleration command $\omega dot\_xy\_cmd$ is determined such that the estimated center-of-gravity velocity values $Vb\_xy\_s$ as the estimated values of the moving velocities of the vehicle system center-of-gravity point is converged to the desired center-of-gravity velocities for control $Vb\_xy\_mdfd$ while maintaining the posture of the base body 9 at the aforesaid basic posture. Incidentally, the desired center-of-gravity velocities for control $Vb\_xy\_mdfd$ are normally 0 (more specifically, unless an occupant or the like imparts an additional propulsion force of the vehicle 1 in the boarding mode). In this case, the imaginary wheel rotational angular acceleration command $\omega dot\_xy\_cmd$ will be determined such that the vehicle system center-of-gravity point is substantially stationary while maintaining the posture of the base body 9 at the aforesaid basic posture.

Then, the rotational angular velocities of the electric motors 31R and 31L, respectively, obtained by converting the imaginary wheel rotational angular velocity commands $\omega w\_xy\_cmd$, which is obtained by integrating each component of $\omega dot\_xy\_cmd$, are determined as the velocity commands $\omega\_R\_cmd$ and $\omega\_L\_cmd$ of the electric motors 31R and 31L. Further, the rotational velocities of the electric motors 31R and 31L are controlled according to the velocity commands $\omega\_R\_cmd$ and $\omega\_L\_cmd$. Thus, the moving velocities of the wheel assembly 5 in the X-axis direction and the Y-axis direction, respectively, are controlled so as to agree with the moving velocity of the imaginary wheel 62_$x$ corresponding to $\omega w\_x\_cmd$ and the moving velocity of the imaginary wheel 62_$y$ corresponding to $\omega w\_y\_cmd$, respectively.

With this arrangement, if, for example, the actual base body tilt angle $\theta b\_x$ deviates from the desired value $\theta b\_x\_obj$ in the direction about the Y-axis by leaning forward, then the wheel assembly 5 moves forward to eliminate the deviation (to converge $\theta be\_x\_s$ to 0). Similarly, if the actual $\theta b\_x$ deviates from the desired value $\theta b\_x\_obj$ by leaning backward, then the wheel assembly 5 moves backward to eliminate the deviation (to converge $\theta be\_x\_s$ to 0).

Further, for example, if the actual base body tilt angle $\theta b\_y$ deviates from the desired value $\theta b\_y\_obj$ in the direction about the X-axis by leaning rightward, then the wheel assembly 5 moves rightward to eliminate the deviation (to converge $\theta be\_y\_s$ to 0). Similarly, if the actual $\theta b\_y$ deviates from the desired value $\theta b\_y\_obj$ by leaning leftward, then the wheel assembly 5 moves leftward to eliminate the deviation (to converge $\theta be\_y\_s$ to 0).

Further, if both the actual base body tilt angles $\theta b\_x$ and $\theta b\_y$ deviate from the desired values $\theta b\_x\_obj$ and $\theta b\_y\_obj$, respectively, then the moving operation of the wheel assembly 5 in the fore-and-aft direction to eliminate the deviation of $\theta b\_x$ and the moving operation of the wheel assembly 5 in the lateral direction to eliminate the deviation of $\theta b\_y$ are combined, so that the wheel assembly 5 will move in a direction combining the X-axis direction and the Y-axis direction (a direction at an angle to both the X-axis direction and the Y-axis direction).

Thus, if the base body 9 tilts from the basic posture, then the wheel assembly 5 moves toward the tilting side. Hence, if, for example, the occupant intentionally inclines his/her upper body in the aforesaid boarding mode, then the wheel assembly 5 will move to the tilting side.

In the case where the desired center-of-gravity velocities for control $Vb\_x\_mdfd$ and $Vb\_y\_mdfd$ are 0, when the posture of the base body 9 converges to the basic posture, the movement of the wheel assembly 5 substantially comes to a halt. Further, if, for example, the tilt angle $\theta b\_x$ of the base body 9 in the direction about the Y-axis is maintained at a certain angle tilted from the basic posture, then the moving velocity of the wheel assembly 5 in the X-axis direction converges to a certain moving velocity corresponding to the angle (a moving velocity having a certain stead-state deviation from the desired center-of-gravity velocity for control $Vb\_x\_mdfd$). The same applies to the case where the tilt angle $\theta b\_y$ of the base body 9 in the direction about the X-axis is maintained at a certain angle tilted from the basic posture.

Figure 12:
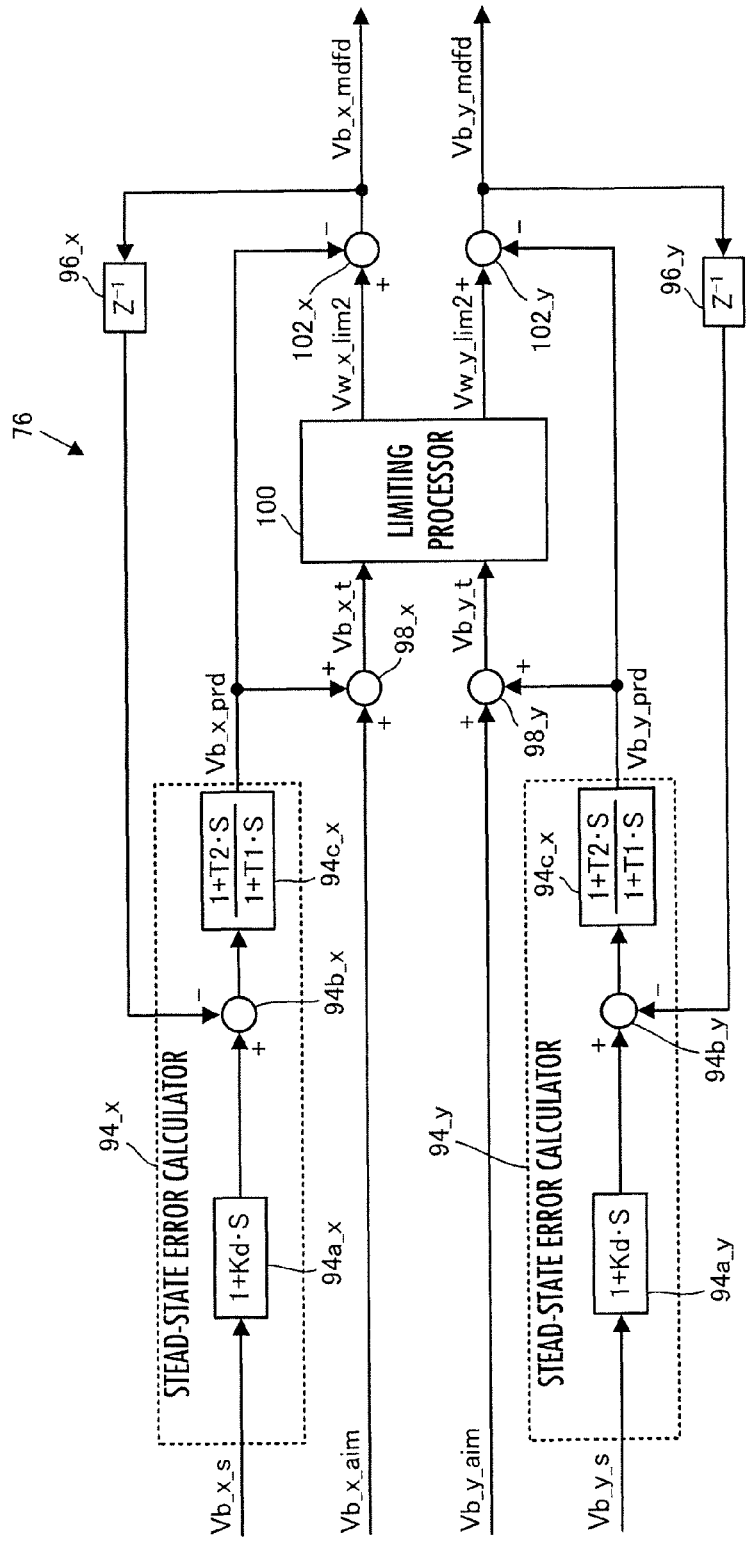
FIG. 12 is a block diagram illustrating a processing function of a center-of-gravity velocity restrictor 76 shown in FIG. 9.

Further, in a situation wherein, for example, the desired center-of-gravity velocities $Vb\_x\_aim$ and $Vb\_y\_aim$ generated by the aforesaid required center-of-gravity velocity generator 74 are both 0, if the amount of the tilt of the base body 9 from the aforesaid basic posture (the base body tilt angle error measured values $\theta be\_x\_s$ and $\theta be\_y\_s$) becomes relatively large, and the moving velocity or velocities of the wheel assembly 5 in one or both of the X-axis direction and the Y-axis direction for eliminating the tilt amount or for maintaining the tilt amount (these moving velocities corresponding to the aforesaid expected center-of-gravity velocity stead-state error values $Vb\_x\_prd$ and $Vb\_y\_prd$, respectively, shown in FIG. 12) are an excessively large moving velocity or velocities that would cause the rotational angular velocity or velocities of one or both of the electric motors 31R and 31L to deviate from the permissible range or ranges thereof, then a velocity in the opposite direction from the moving velocity of the wheel assembly 5 (more detailedly, $Vw\_x\_lim2-Vb\_x\_prd$ and $Vw\_y\_lim2-Vb\_y\_prd$) will be determined as the desired center-of-gravity velocities for control $Vb\_x\_mdfd$ and $Vb\_y\_mdfd$. Then, the manipulated variable components $u3$_$x$ and $u3$_$y$ among the manipulated variable components constituting a control input are determined such that the estimated center-of-gravity velocity values $Vb\_x\_s$ and $Vb\_y\_s$ will be converged to the desired center-of-gravity velocities for control $Vb\_x\_mdfd$ and $Vb\_y\_mdfd$, respectively. This prevents the amount of a tilt of the base body 9 from the aforesaid basic posture from becoming excessively large, thus preventing the rotational angular velocity or velocities of one or both of the electric motors 31R and 31L from becoming excessively high.

Further, in the aforesaid gain adjustor 78, in the situation wherein one or both of the estimated center-of-gravity velocity values Vb_x_s and Vb_y_s become large, and the moving velocity or velocities of the wheel assembly 5 in one or both of the X-axis direction and the Y-axis direction required to eliminate the tilt of the base body 9 from the aforesaid basic posture or to maintain the tilt amount may become an excessively large moving velocity that would cause the rotational angular velocity or velocities of one or both of the electric motors 31R and 31L to deviate from the permissible range or ranges thereof, as the deviation becomes more notable (more specifically, as the absolute values of Vover_x and Vover_y shown in FIG. 10 increase), one or both of the aforesaid gain adjustment parameters Kr_x and Kr_y are brought closer to 1 from 0.

In this case, each i-th gain coefficient Ki_x (i=1, 2 or 3) calculated according to the aforesaid expression 09x approaches to the constant value Ki_b_x on the maximum end from the constant value Ki_a_x on the minimum end, as Kr_x approaches to 1. The same applies to each i-th gain coefficient Ki_y (i=1, 2 or 3) calculated according to the aforesaid expression 09y.

As the absolute values of the aforesaid gain coefficients increase, the sensitivities of the manipulated variables (the imaginary wheel rotational angular acceleration commands ωwdot_x_cmd and ωwdot_y_cmd) in response to a change in the tilt of the base body 9 increase. Hence, the moment the amount of a tilt of the base body 9 from the basic posture indicates an increase, the moving velocity of the wheel assembly 5 will be controlled to immediately eliminate the tilt amount. This intensely restrains the base body 9 from considerably tilting from the basic posture, thus making it possible to prevent the moving velocity or velocities of the wheel assembly 5 in one or both of the X-axis direction and the Y-axis direction from becoming an excessively high moving velocity that causes the rotational angular velocity or velocities of one or both of the electric motors 31R and 31L to deviate from the permissible range or ranges thereof.

Further, in the boarding mode, if the required center-of-gravity velocity generator 74 generates the required center-of-gravity velocities Vb_x_aim and Vb_y_aim (required center-of-gravity velocities in which one or both of Vb_x_aim and Vb_y_aim are not 0) according to a request made by a steering operation performed by the occupant or the like, then the required center-of-gravity velocities Vb_x_aim and Vb_y_aim are determined as the aforesaid desired center-of-gravity velocities for control Vb_x_mdfd and Vb_y_mdfd, respectively, unless the rotational angular velocity or velocities of one or both of the electric motors 31R and 31L become a high rotational angular velocity or velocities that deviate from the permissible range or ranges thereof (more detailedly, as long as Vw_x_lim2 and Vw_y_lim2 shown in FIG. 12 agree with Vb_x_t and Vb_y_t, respectively). Thus, the moving velocity of the wheel assembly 5 is controlled such that the required center-of-gravity velocities Vb_x_aim and Vb_y_aim are implemented (such that the actual center-of-gravity velocities approach to the required center-of-gravity velocities Vb_x_aim and Vb_y_aim).

The processing by the aforesaid required center-of-gravity velocity generator 74, the description of which has been deferred, will now be described in detail.

In the present embodiment, if the operation mode of the vehicle 1 is the autonomous mode, then the required center-of-gravity velocity generator 74 sets the required center-of-gravity velocities Vb_x_aim and Vb_y_aim to 0, as described above.

Meanwhile, in the case where the operation mode of the vehicle 1 is the boarding mode, on the basis of the steering operation of the vehicle 1 by an occupant or the like (the operation for adding a propulsive force to the vehicle 1), the required center-of-gravity velocity generator 74 variably determines the required center-of-gravity velocity Vb_x_aim in the X-axis direction, while maintaining the required center-of-gravity velocity Vb_y_aim in the Y-axis direction to 0.

Here, for example, in the case where the occupant of the vehicle 1 intends to positively increase the traveling velocity of the vehicle 1 (the moving velocity of the vehicle system center-of-gravity point) in the fore-and-aft direction at the time of starting the vehicle 1 or the like, the occupant kicks a floor with his/her foot thereby to add a propulsive force for increasing the traveling velocity of the vehicle 1 (a propulsive force by the force of friction between the foot of the occupant and the floor) in the fore-and-aft direction to the vehicle 1. Alternatively, for example, an outside assistant or the like may add the propulsive force for increasing the traveling velocity to the vehicle 1 in the fore-and-aft direction in response to a request from the occupant of the vehicle 1.

In such case, the required center-of-gravity velocity generator 74 determines the existence or nonexistence of a generation of an acceleration request as the request for increasing the traveling velocity of the vehicle 1 (more specifically, the traveling velocity of the vehicle system center-of-gravity point) in the X-axis direction, on the basis of the temporal change rate of the magnitude (absolute value) of the estimated center-of-gravity velocity value Vb_x_s in the X-axis direction calculated by the center-of-gravity velocity calculator 72, and then, according to the determination result, the required center-of-gravity velocity generator 74 sequentially determines the required center-of-gravity velocity Vb_x_aim. In an ordinary state excluding the time of generation of the acceleration request and the period immediately after the generation, the required center-of-gravity velocity generator 74 retains the required center-of-gravity velocity Vb_x_aim in the X-axis direction to 0.

Figure 14:
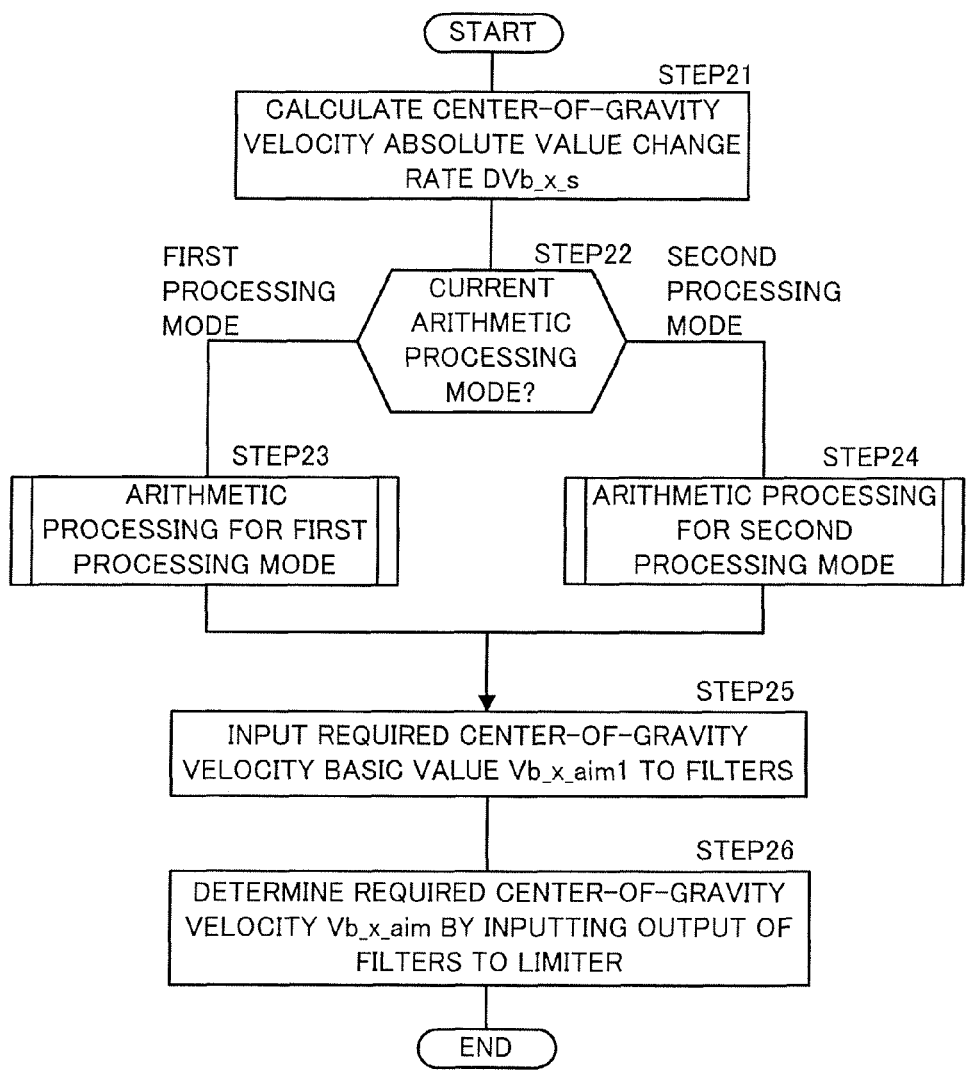
FIG. 14 is a flowchart illustrating the processing by a required center-of-gravity velocity generator 74 shown in FIG. 9.

More specifically, the required center-of-gravity velocity generator 74 determines the required center-of-gravity velocity Vb_x_aim in the X-axis direction, by sequentially executing the process shown in the flow chart of FIG. 14 in the predetermined control processing cycle.

The required center-of-gravity velocity generator 74 first carries out the processing in STEP21. In the processing, the required center-of-gravity velocity generator 74 calculates the temporal change rate (differential value) DVb_x_s of the absolute value |Vb_x_s| of the estimated center-of-gravity velocity value Vb_x_s input thereto. Hereinafter, DVb_x_s will be referred to as the center-of-gravity velocity absolute value change rate DVb_x_s.

Subsequently, the required center-of-gravity velocity generator 74 proceeds to STEP22 to determine which mode the current arithmetic processing mode of the control unit 50 for determining the imaginary wheel rotational angular acceleration commands ωwdot_x_cmd, ωwdot_y_cmd is.

Here, according to the present embodiment, the required center-of-gravity velocity generator 74 first determines the basic value of the required center-of-gravity velocity Vb_x_aim (hereinafter, referred to as the basic required center-of-gravity velocity value Vb_x_aim1), and then determines the required center-of-gravity velocity Vb_x_aim to cause the required center-of-gravity velocity Vb_x_aim to follow (steadily agree with) the basic required center-of-gravity velocity value Vb_x_aim1 with a response time constant of a first order lag. In this case, the manner of determining the basic required center-of-gravity velocity value Vb_x_aim1 is specified by the arithmetic processing mode.

According to the present embodiment, the arithmetic processing mode comes in two types, namely, a first processing mode and a second processing mode.

The first processing mode is a processing mode for determining ωwdot_x_cmd, ωwdot_x_cmd so as to attenuate the traveling velocity of the vehicle 1 (so as to make the center-of-gravity velocities Vb_xy in the X-axis direction and the Y-axis direction closer to 0 by the function of the third manipulated variable components u3_xy). In the first processing mode, the required center-of-gravity velocity generator 74 sequentially determines the basic required center-of-gravity velocity value Vb_x_aim1 so as to converge the required center-of-gravity velocity Vb_x_aim in the X-axis direction to 0 (stationary retain the same to 0), while retaining the required center-of-gravity velocity Vb_x_aim in the Y-axis direction to 0.

Further, the second processing mode is a processing mode for determining ωwdot_x_cmd, ωwdot_x_cmd so that the attenuation of the traveling velocity of the vehicle 1 in the X-axis direction is difficult to occur in comparison with the first processing mode (so that the third manipulated variable component u3_x in the X-axis direction becomes 0 or a value close thereto). In the second processing mode, the required center-of-gravity velocity generator 74 sequentially determines the basic required center-of-gravity velocity value Vb_x_aim1 so as to make the required center-of-gravity velocity Vb_x_aim in the X-axis direction follow (to approximately coincide with) the estimated center-of-gravity velocity value Vb_x_s as the actual traveling velocity in the X-axis direction of the vehicle system center-of-gravity point, while retaining the required center-of-gravity velocity Vb_x_aim in the Y-axis direction to 0.

Here, the arithmetic processing mode in the state where the control unit 50 is initialized at the activation of the control unit 50 and the like (an initial arithmetic processing mode) is the first processing mode.

In the case where the current arithmetic processing mode in above-mentioned STEP22 is the first processing mode and in the case where the same is the second processing mode, the required center-of-gravity velocity generator 74 determines the basic required center-of-gravity velocity value Vb_x_aim1 by respectively carrying out the arithmetic processing in STEP23 and the arithmetic processing in STEP24.

The arithmetic processing corresponding to each of the aforesaid modes is carried out as described below.

Figure 15:
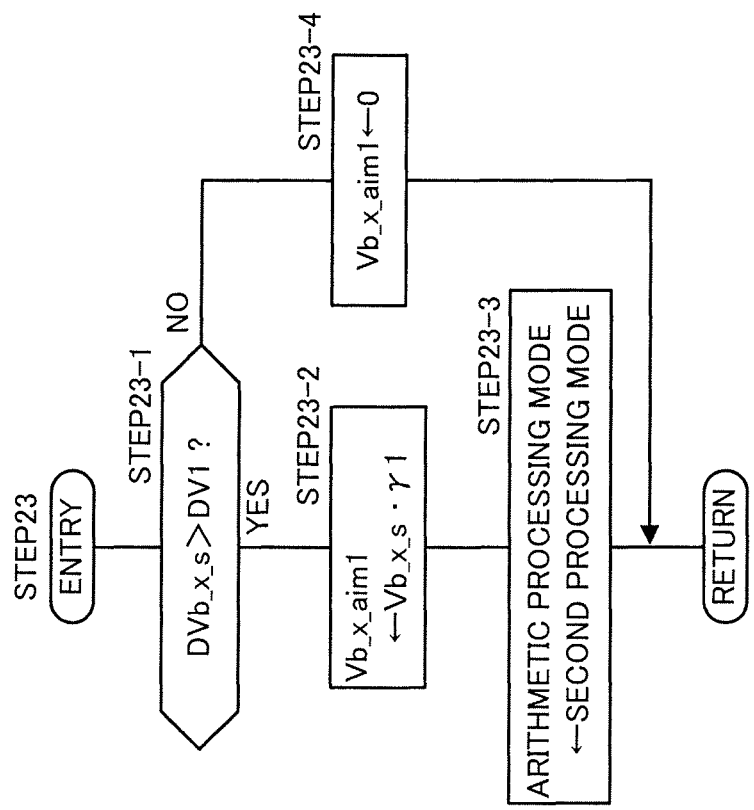
FIG. 15 is a flowchart illustrating the subroutine processing in STEP23 of FIG. 14.

The arithmetic processing for the first processing mode in STEP23 is carried out as illustrated by the flowchart of FIG. 15. To be more specific, the required center-of-gravity velocity generator 74 first determines in STEP 23-1 whether or not the center-of-gravity velocity absolute value change rate DVb_x_s, which had been calculated in STEP21, is larger than a first threshold value DV1_x(>0), which is a positive value determined in advance. The determination processing is the processing for determining whether there is an acceleration request for increasing the traveling velocity of the vehicle 1 substantially in the fore-and-aft direction.

In this case, if DVb_x_s>DV1_x holds, then it means a situation wherein the absolute value |Vb_x| of the actual center-of-gravity velocity Vb_x in the X-axis direction is increasing at a temporal change rate that is larger than the first threshold value DV1. Hence, the situation in which the determination result in STEP23-1 is affirmative is a situation in which a steering operation for increasing the magnitude of the center-of-gravity velocity Vb_x approximately in the fore-and-aft direction by an occupant or an outside assistant or the like (a steering operation for adding a propulsive force approximately in the fore-and-aft direction to the vehicle 1) is being carried out.

In the case where the determination result in STEP 23-1 becomes negative, that is, in the case where there is no acceleration request of the vehicle 1 (acceleration request in the fore-and-aft direction of the vehicle 1), then the required center-of-gravity velocity generator 74 sets the value of the basic required center-of-gravity velocity value Vb_x_aim1 to 0, and terminates the processing in FIG. 15.

On the other hand, in the case where the determination result in STEP23-1 becomes affirmative, that is, in the case where the acceleration request of the vehicle 1 in the fore-and-aft direction is generated, the required center-of-gravity velocity generator 74 determines the basic required center-of-gravity velocity value Vb_x_aim1 in STEP23-2. In this case, the required center-of-gravity velocity generator 74 determines a value obtained by multiplying the estimated center-of-gravity velocity value Vb_x_s in the X-axis direction input from the center-of-gravity velocity calculator 72 by a first ratio γ1 of a predetermined value set beforehand as the basic required center-of-gravity velocity value Vb_x_aim1. The aforesaid first ratio γ1 is set to a positive value slightly smaller than 1 (e.g., 0.8) in the present embodiment. The processing in STEP 23-2 is for matching the manner of determining Vb_x_aim1 to the second processing mode which starts from the next control processing cycle.

The value of the aforesaid first ratio γ1 being slightly smaller than 1 is not essential. The value of the first ratio γ1 may be set to, for example, 1 or a value slightly larger than 1. In the present embodiment, the value of the first ratio γ1 is set to a value slightly less than 1 in order to prevent the occupant from feeling (in a sensory manner) the traveling velocity of the vehicle 1 (more specifically, the traveling velocity of the vehicle system center-of-gravity point) as faster than the actual traveling velocity during increasing of the traveling velocity of the vehicle 1.

Subsequently, the required center-of-gravity velocity generator 74 changes the arithmetic processing mode from the first processing mode to the second processing mode in STEP23-3, and terminates the processing in FIG. 15.

The above has described the arithmetic processing for the first processing mode in STEP23.

Here, in the case where the determination result in STEP23-1 becomes negative, the arithmetic processing mode is not changed. Therefore, even in the next control processing cycle, the arithmetic processing mode is maintained at the first processing mode.

Subsequently, the arithmetic processing for the second processing mode in STEP24 is carried out as is shown in the flowchart in FIG. 16. Specifically, the required center-of-gravity velocity generator 74 first determines in STEP 24-1 whether or not the center-of-gravity velocity absolute value change rate DVb_x_s calculated in above-mentioned STEP21 is smaller than a third threshold value DV3 (<0), which is a negative value determined in advance. The determination processing is the processing for determining whether there is a deceleration request by the occupant of the vehicle 1 to positively decrease the magnitude of the center-of-gravity velocity Vb_x. Hence, the situation in which the determination result in STEP24-1 is affirmative is a situation in which the occupant of the vehicle 1 intentionally contacts his/her feet to the ground, and generates a frictional force between his/her feet and the floor in the braking direction of the vehicle 1.

Thereafter, in the case where the determination result in STEP24-1 is affirmative (in the case where deceleration request has been generated), the required center-of-gravity velocity generator 74 sets the value of the basic required center-of-gravity velocity value Vb_x_aim1 to 0 in STEP24-9. Further, the required center-of-gravity velocity generator 74 changes the arithmetic processing mode from the second processing mode to the first processing mode, and terminates the processing in FIG. 16.

And, in the case where the determination result in STSEP 24-1 is negative (in the case where no deceleration request has been generated), the required center-of-gravity velocity generator 74 subsequently carries out the determination processing in STEP 24-2.

In the determination processing, the required center-of-gravity velocity generator 74 determines whether or not the center-of-gravity velocity absolute value change rate DVb_x_s (the value calculated in STEP21) is smaller than a predetermined second threshold value DV2 set beforehand. In the present embodiment, the second threshold value DV2 is set to a predetermined negative value that is larger than the aforesaid third threshold value DV3 (closer to 0 than DV3). The second threshold value DV2 may be set to 0 or a positive value that is slightly larger than 0 (but less than the aforesaid first threshold value DV1).

The determination processing in STEP24-2 is for determining whether the acceleration request is resolved or not (whether the state where the propulsive force is applied to the vehicle 1 in order to increase the traveling velocity of the vehicle 1 is finished or not).

Figure 16:
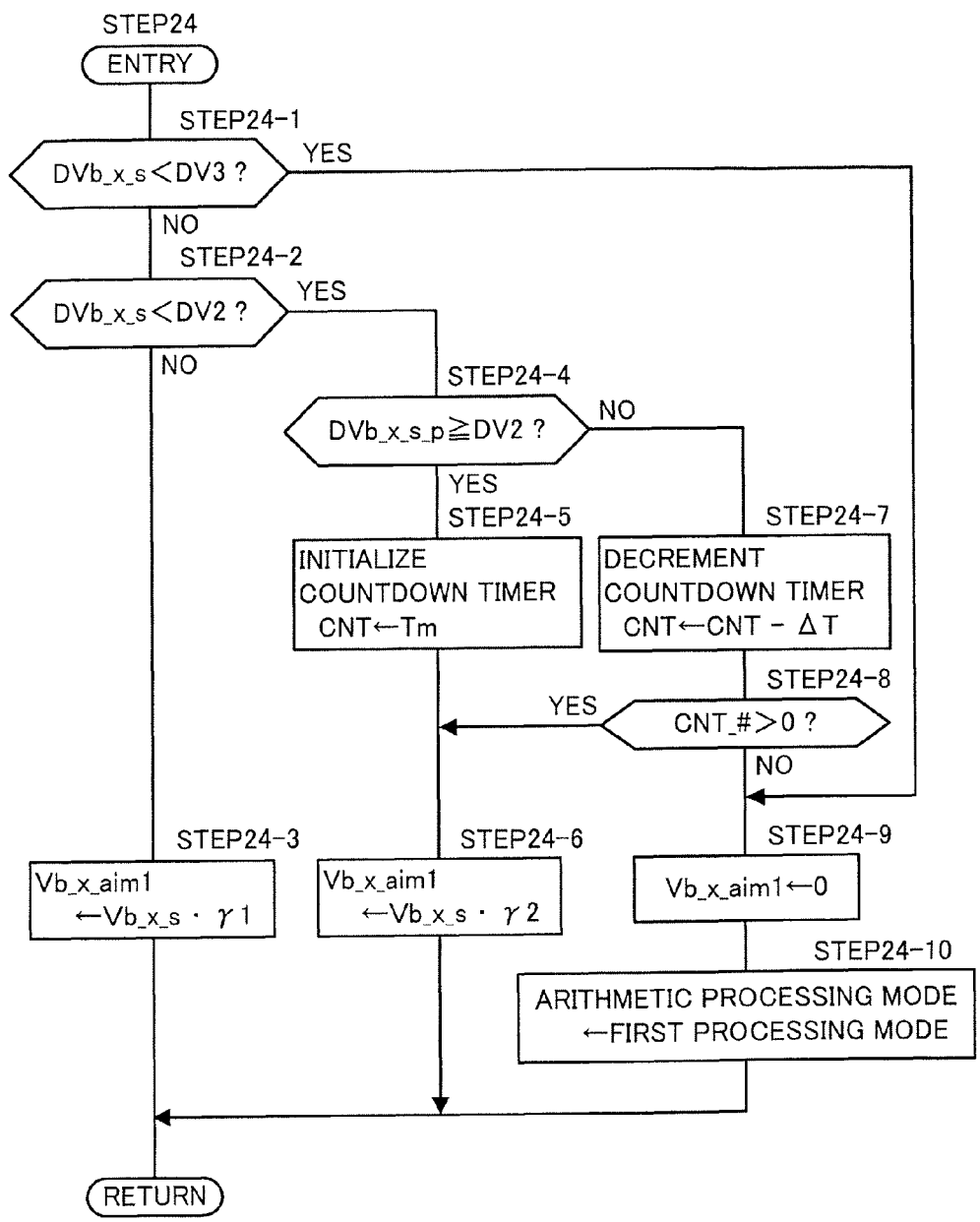
FIG. 16 is a flowchart illustrating the subroutine processing in STEP24 of FIG. 14.

Thereafter, in the case where the determination result in STEP24-2 is negative, the required center-of-gravity velocity generator 74 determines the basic required center-of-gravity velocity value Vb_x_aim1 in STEP24-3 on the premise that the acceleration request is continuing, and terminates the processing in FIG. 16. In this case, in STEP24-3, Vb_x_aim1 is determined by the same processing as in above-mentioned STEP23-2. That is, the required center-of-gravity velocity generator 74 determines a value obtained by multiplying the estimated center-of-gravity velocity value Vb_x_s in the X-axis direction input from the center-of-gravity velocity calculator 72 by the above-mentioned first ratio $\gamma 1$ as Vb_x_aim1. Here, in this case, the arithmetic processing mode is maintained at the second processing mode even in the next control processing cycle.

Further, in the case where the determination result in STEP24-2 is affirmative, that is, in the case where it is determined that the acceleration request is resolved, the required center-of-gravity velocity generator 74 further carries out the determination processing in STEP24-4.

In the determination processing, it is determined whether the previous value DVb_x_s_p of the center-of-gravity velocity absolute value change rate DVb_x_s is equal to or more than the second threshold value DV2 or not, that is, it is determined whether the determination result in STEP24-2 in the previous control processing cycle was negative or not.

The fact that the determination result in STEP24-4 becomes affirmative means that the current control processing cycle is in a timing immediately after the state where the acceleration request is continuing is switched to the resolved state. Then, in this case, the required center-of-gravity velocity generator 74 initializes the countdown timer in STEP24-5.

The aforesaid countdown timer is a timer that counts the elapsed time from after resolving of the acceleration request (more specifically, the elapsed time in the state where no acceleration request and deceleration request is generated). Further, in STEP24-5, preset initial value Tm is set for the time count value CNT of the timer. The initial value Tm means a set value of the time intended for continuing the second processing mode in the state where no acceleration request and deceleration request is generated after resolving of the acceleration request.

Subsequently, the required center-of-gravity velocity generator 74 determines the basic required center-of-gravity velocity value Vb_x_aim1 in STEP24-6, and terminates the processing in FIG. 16. Here, in this case, the arithmetic processing mode is maintained at the second processing mode even in the next control processing cycle.

In the present embodiment, the required center-of-gravity velocity generator 74 determines in the above STEP24-6 a value obtained by multiplying the estimated center-of-gravity velocity value Vb_x_s in the X-axis direction input from the center-of-gravity velocity calculator 72 by a second ratio $\gamma 2$ of a predetermined value set beforehand as the basic required center-of-gravity velocity value Vb_x_aim1. In the present embodiment, the above-mentioned second ratio $\gamma 2$ may be set to a positive value closer to 1 than the first ratio $\gamma 1$ (for example, 0.9).

Here, it is not necessary for the value of the second ratio $\gamma 2$ to be a value closer to 1 than the first ratio $\gamma 1$, and, for example, the value of the second ratio $\gamma 2$ may be set to a same value with the first ratio $\gamma 1$. Alternatively, the second ratio $\gamma 2$ may be set to 1, or a value slightly larger than 1, or a value slightly smaller than the first ratio $\gamma 1$. It is preferable for the second ratio $\gamma 2$ to coincide with or almost coincide with the first ratio $\gamma 1$, basically at a value in the vicinity of 1.

If the determination result in the aforesaid STEP24-4 is negative (more specifically, in the case where the state in which no acceleration request and deceleration request is generated after resolving of the acceleration request, is continuing), then the required center-of-gravity velocity generator 74 decrements the time count value CNT on the countdown timer in STEP24-7. More specifically, the time count value CNT is updated by subtracting a predetermined value $\Delta T$ (the time of the control processing cycle) from the current value of the time count value CNT.

Subsequently, the required center-of-gravity velocity generator 74 determines in STEP24-8 whether or not the time count value CNT on the countdown timer is larger than 0, that is, whether the time count of the countdown timer has finished.

If the determination result in this STEP24-8 is affirmative, it means that the time indicated by the aforesaid initial value Tm on the countdown timer has not yet elapsed since resolving of the acceleration request. In this case, the required center-of-gravity velocity generator 74 determines Vb_x_s·$\gamma 2$ as the basic required center-of-gravity velocity value Vb_x_aim1 by carrying out the processing in STEP24-6, and terminates the processing in FIG. 16. In this case, the arithmetic processing mode will be maintained to the second processing mode also at the next control processing cycle.

If the determination result in the aforesaid STEP24-8 is negative, that is, if the predetermined time indicated by the initial value Tm on the countdown timer has elapsed since resolving of the acceleration request, then the required center-of-gravity velocity generator 74 sets the value of the basic required center-of-gravity velocity value Vb_x_aim1 as 0 in STEP24-9.

Further, the required center-of-gravity velocity generator 74 returns the arithmetic processing mode from the second processing mode to the first processing mode in STEP24-10, and terminates the processing in FIG. 16.

The above has described the arithmetic processing for the second processing mode in STEP24.

Returning to the description of FIG. 14, the required center-of-gravity velocity generator 74 carries out the arithmetic processing in either one of STEP23 and STEP24 as described above, and then carries out the processing for inputting the basic required center-of-gravity velocity value Vb_x_aim1 determined by the arithmetic processing to filters in STEP25.

The filter is, for example, a first-order lag filter (low-pass filter). Therefore, the output value of the filter obtained in STEP 25 follows the basic required center-of-gravity velocity value Vb_x_aim1 by a certain time constant. Therefore, even if Vb_x_aim1 changes rapidly or discontinuously immediately after changing of the arithmetic processing mode or the like, the output value of the filter follows Vb_x_aim1 (stationary coincide with Vb_x_aim1) while changing smoothly.

Subsequently, the required center-of-gravity velocity generator 74 proceeds to STEP 26 and finally determines the final required center-of-gravity velocity Vb_x_aim in the X-axis direction, by inputting the output value of the filter through a limiter. In this case, the limiter is used to prevent the absolute value of the required center-of-gravity velocity Vb_x_aim from becoming excessive, and outputs the output value of the filter directly as the required center-of-gravity velocity Vb_x_aim if the output value of the filter falls within the range of a predetermined upper limit value (>0) and a lower limit value (<0) set beforehand. Further, in the case where the absolute value of the output value of the filter exceeds the range between the aforementioned upper limit value and the lower limit value, the limiter outputs the limit value of the upper limit value or the lower limit value, whichever is closer to the output value of the filter, as the required center-of-gravity velocity Vb_x_aim.

Here, the absolute value of the above-mentioned upper limit value and the lower limit value may not be identical, and the absolute values thereof may be different from one another.

The above is the details of the generation processing of the required center-of-gravity velocity Vb_x_aim in the X-axis direction.

Supplementarily, the time constant of the filter used in STEP25 may be changed according to the arithmetic processing mode and the like. For example, the time constant of the filter may be set to a relatively long time value in the first processing mode, and the time constant of the filter may be set to a relatively short time value in the second processing mode. By doing so, the required center-of-gravity velocity Vb_x_aim is prevented from attenuating rapidly in the first processing mode, especially immediately after transition from the second processing mode. Further, it becomes possible to make the required center-of-gravity velocity Vb_x_aim follow the change of the actual center-of-gravity velocity Vb_x rapidly in the second processing mode, especially during increase of the actual center-of-gravity velocity Vb_x in the X-axis direction of the vehicle 1. Further, for example, in the first processing mode, the time constant of the filter may be set shorter so as to make the required center-of-gravity velocity Vb_x_aim attenuate more rapidly to 0 in the state where the deceleration request has been generated, than in the state where the deceleration request is not generated.

Further, for example, immediately after the arithmetic processing mode changes from the second processing mode to the first processing mode, the basic required center-of-gravity velocity value Vb_x_aim1 itself may be changed gradually at a predetermined rate of change (a predetermined temporal change rate) to 0.

By the processing of the required center-of-gravity velocity generator 74 explained above, the required center-of-gravity velocity Vb_x_aim in the X-axis direction is determined by a manner explained below.

For example, a case will be assumed where, in order to increase the traveling velocity of the vehicle 1 in the fore-and-aft direction (the X-axis direction) of the occupant, an occupant kicks a floor with his/her foot or an assistant or the like pushes the vehicle 1 so as to add a propulsive force to the vehicle 1 approximately in the fore-and-aft direction (more specifically, a propulsive force that causes the determination result in the aforesaid STEP23-1 to be affirmative).

It is assumed that the arithmetic processing mode before the propulsive force is added is the aforesaid first processing mode. Here, for the sake of understanding, it is assumed that the output value of the filter obtained in STEP 25 of FIG. 14 is a value that falls within a range not subjected to the forcible restriction placed by the limiter in STEP26. That is, the required center-of-gravity velocity Vb_x_aim sequentially determined in STEP 26 coincides with the value that is obtained by inputting the basic required center-of-gravity velocity value Vb_x_aim1 through the filter. Similarly, it is assumed that the actual center-of-gravity velocity values Vb_x and Vb_y fall within a range not subjected to the forcible restriction on the output values V_x_lim2 and V_y_lim2 in the limiting processor 104. That is, the desired center-of-gravity velocity for control Vb_x_mdfd, Vb_y_mdfd respectively coincides with the required center-of-gravity velocity Vb_x_aim, Vb_y_aim. Such state is a normal (general) operating state of the vehicle 1.

In this case, if the addition of the propulsive force to the vehicle 1 causes the determination result in STEP23-1 to be affirmative, then the arithmetic processing mode is changed from the first processing mode to the second processing mode by the processing in STEP23-3 of FIG. 15.

In this second processing mode, in the situation where no deceleration request is generated (in the situation where the determination result in STEP 24-1 becomes negative) in a period until the acceleration request is dissolved (a period until the determination result in STEP 24-2 becomes affirmative), a value obtained by multiplying the current value (the present value) of the estimated center-of-gravity velocity value Vb_x_s in the X-axis direction by the first ratio γ1 of a predetermined value, i.e., a velocity value whose magnitude is slightly smaller than Vb_x_s, is sequentially determined as the basic required center-of-gravity velocity value Vb_x_aim1.

Because of this, the required center-of-gravity velocity Vb_x_aim sequentially determined by the required center-of-gravity velocity generator 74 is determined to follow a velocity value (=γ1·Vb_x_s) that approximately coincides with the actual center-of-gravity velocity Vb_x that is increasing by the propulsive force applied to the vehicle 1.

Then, the required center-of-gravity velocity Vb_x_aim determined as is explained above is determined as the aforesaid desired center-of-gravity velocity for control Vb_x_mdfd in the X-axis direction. Therefore, Vb_x_mdfd becomes a value that coincides or approximately coincides with γ1·Vb_x_s. Further, the required center-of-gravity velocity Vb_y_aim in the Y-axis direction is maintained at 0, the desired center-of-gravity velocity for control Vb_x_mdfd in the Y-axis direction becomes 0. Further, the third manipulated variable components u3_x and u3_y included in the imaginary wheel rotational angular acceleration commands ωwdot_x_cmd and ωwdot_y_cmd, respectively, are determined to cause the estimated center-of-gravity velocity values Vb_x_s and Vb_y_s to converge to the desired center-of-gravity velocities for control Vb_x_mdfd and Vb_y_mdfd, respectively.

As a result, the moving velocity of the wheel assembly 5 is controlled such that the actual moving velocity of the vehicle system center-of-gravity point is promptly increased (increased approximately in the fore-and-aft direction) by the propulsive force added to the vehicle 1 by the occupant according to a request based on the propulsive force. Thus, the vehicle 1 will be smoothly accelerated by the added propulsive force in the fore-and-aft direction of the occupant.

More specifically, because Vb_x_mdfd becomes a value coinciding with or almost coinciding with γ1·Vb_x_s as is explained above, the third manipulated variable component u3__x related to X-axis direction becomes u3__x=K3__x·(Vb_x_s−Vb_x_mdfd)≈K3__x·(1−γ1)·Vb_x_s. Then, K3__x(1−γ1) corresponds to sensitivity to change of ωwdot_x_cmd with respect to change in Vb_x_s (hereinafter sometimes referred to a sensitivity to velocity). In this case, 1−γ1 is a value close to 0 (in the present embodiment, for example 0.2), so that the above-mentioned sensitivity to velocity becomes close to 0. Therefore, ωwdot_x_cmd has low dependency on Vb_x_s, so that change in ωwdot_x_cmd becomes minute even Vb_x_s changes. Consequently, the driving force to be imparted in the X-axis direction to the wheel assembly 5 by the electric motors 31R, 31L becomes difficult to receive regulation according to the value of Vb_x_s. As a result, the vehicle 1 smoothly accelerates in the fore-and-aft direction of the occupant by the propulsive force applied thereto, as is explained above.

Subsequently, when the application of propulsive force to the vehicle 1 is finished and the acceleration request is resolved continuously in the second processing mode (when the determination result in STEP24-2 and 24-4 in FIG. 16 becomes affirmative and negative, respectively), a value obtained by multiplying the current value (present value) of the estimated center-of-gravity velocity value Vb_x_s in the X-axis direction by the second ratio γ2 of a predetermined value, that is, a velocity value of a magnitude slightly smaller than Vb_x_s is sequentially determined as the basic required center-of-gravity velocity value Vb_x_aim1 in the period of a predetermined time Tm until the timing of the countdown timer is finished.

Therefore, the required center-of-gravity velocity Vb_x_aim sequentially determined by the required center-of-gravity velocity generator 74 is determined so as to follow the velocity value (=γ2·Vb_x_s) almost coinciding with the actual center-of-gravity velocity Vb_x, similarly to the period after the second processing mode is started until the acceleration request is resolved.

Then, the required center-of-gravity velocity Vb_x_aim determined as explained above is determined as the desired center-of-gravity velocity for control Vb_x_mdfd in the X-axis direction. Therefore, Vb_x_mdfd becomes a value coinciding with or almost coinciding with γ2·Vb_x_s. Further, the required center-of-gravity velocity Vb_y_aim in the Y-axis direction is retained at 0, the desired center-of-gravity velocity for control Vb_y_mdfd in the Y-axis direction becomes 0. Further, the manipulated variable components u3__x and u3__y included in the imaginary wheel rotational angular acceleration commands ωwdot_x_cmd and ωwdot_y_cmd, respectively, are determined to cause the estimated center-of-gravity velocity values Vb_x_s and Vb_y_s to converge to the desired center-of-gravity velocities for control Vb_x_mdfd and Vb_y_mdfd, respectively.

In this case, the third manipulated variable component u3__x related to the X-axis direction becomes u3__x=K3__x·(Vb_x_s−Vb_x_mdfd)≈K3__x·(1−γ2)·Vb_x_s. Therefore, K3__x·(1−γ2) corresponds to the sensitivity to velocity. Further, 1−γ2 is a value close to 0 (in the present embodiment, for example, 0.1), so that the above-mentioned sensitivity to speed becomes close to 0. Therefore, ωwdot_x_cmd has low dependency with respect to Vb_x_s, similarly to the period after the second processing mode is started until the acceleration request is resolved.

As a result, even when the acceleration request is resolved, in the period until lapse of the predetermined time Tm after resolving, the driving force to be imparted in the X-axis direction to the wheel assembly 5 by the electric motors 31R, 31L becomes difficult to receive the influence of the value of Vb_x_s, unless the deceleration request is generated. In this case, unless the occupant tilts the base body 9 and the sheet 3 so as to displace the vehicle system center-of-gravity point to rearward side of the vehicle 1 than the position in the basic posture, the driving force in the braking direction hardly acts on the wheel assembly 5. Therefore, after acceleration of the vehicle 1, during the period of the predetermined time Tm, the gliding state of the vehicle 1 is maintained even when the occupant does not perform maneuvering operation such as positively moving its upper body.

Subsequently, in the second processing mode, in the case where the deceleration request has been generated or the predetermined period Tm lapsed after resolving of the acceleration request, the required center-of-gravity velocity Vb_x_aim in the X-axis direction is determined so as to attenuate to 0 and finally held at 0. Then, Vb_x_aim determined as explained above is determined as the above-mentioned desired center-of-gravity velocity for control Vb_x_mdfd in the X-axis direction. Further, the required center-of-gravity velocity Vb_y_aim in the Y-axis direction is retained at 0, so that the desired center-of-gravity velocity for control Vb_y_mdfd in the Y-axis direction becomes 0. Further, the third manipulated variable components u3__x, u3__y contained in each imaginary wheel rotational angular acceleration commands ωwdot_x_cmd, ωwdot_y_cmd, respectively, are determined so as to converge the estimated center-of-gravity velocity values Vb_x_s, Vb_y_s to the desired center-of-gravity velocities for control Vb_x_mdfd, Vb_y_mdfd, respectively.

In this case, the third manipulated variable component u3__x related to the X-axis direction begins to increase in the braking direction. Therefore, the traveling velocity in the X-axis direction of the vehicle 1 begins to attenuate.

Supplementarily, in the first processing mode, the desired center-of-gravity velocity for control Vb_x_mdfd in the X-axis direction basically becomes 0 or monotonously brought closer to 0. Thereafter, in this state, the sensitivity to velocity coincides with the third gain coefficient K3__x (>K3__x·(1−γ1)), or approaches from K3__x·(1−γ2) to K3__x. Therefore, in the second processing mode, the sensitivity to velocity becomes relatively lower than that in the first processing mode. Further, in the first processing mode, the driving force imparted to the wheel assembly 5 in order to bring Vb_x_s closer to 0 is acted more strongly than that in the second processing mode.

Further, in either of the first processing mode and the second processing mode, the desired center-of-gravity velocity for control Vb_y_mdfd in the Y-axis direction basically becomes 0. Therefore, in the present embodiment, the traveling velocity Vb_y of the vehicle system center-of-gravity point in the Y-axis direction becomes difficult to fluctuate.

For example, by setting γ1, γ2 to 1, it becomes possible to make the third manipulated variable component u3__x in the second processing mode to 0. In such case, it becomes possible to determine ωwdot_x_cmd so that the same does not completely receive influence of the center-of-gravity velocity Vb_x_s in the X-axis direction in the second processing mode.

Here, the correspondence relationship between the vehicle 1 of the present embodiment and the present invention will be supplementally described.

In the present embodiment, the X-axis direction the Y-axis direction correspond to the first direction and the second direction, respectively, of the present invention.

Further, the tilt sensor 52 and the processing of STEP2 in FIG. 7 embody the tilt angle measuring element of the present invention. Moreover, the tilt angles θb_x, θb_y of the base body 9 correspond to the tilt angle of a payload supporting part in the present invention.

Further, the vehicle system center-of-gravity point (more specifically, the vehicle-occupant overall center-of-gravity point) corresponds to the predetermined representative point of the vehicle in the present invention, and the center-of-gravity velocity calculator 72 embodies the representative point velocity measuring element of the present invention. Further, the center-of-gravity velocities Vb_x, Vb_y corresponds to the traveling velocity of the representative point in the present invention.

Further, the processing of STEP9, 10 in FIG. 7 carried out by the control unit 50 embodies the traveling motion unit control element of the present invention.

Further, the imaginary wheel rotational angular acceleration commands ωwdot_x_cmd, ωwdot_y_cmd respectively corresponds to the manipulated variable for control of the present invention. In this case, more specifically, ωwdot_x_cmd corresponds to the first manipulated variable for control, and ωwdot_y_cmd corresponds to the second manipulated variable for control.

Further, in the present embodiment, the first gain coefficient K1_x, the third gain coefficient K3_x, the first manipulated variable component u1_x (the first term on the right side of expression 07x), and the third manipulated variable component u3_x (the third term on the right side of expression 07x) in the first processing mode respectively corresponds to the first a gain coefficient, the first b gain coefficient, the first a manipulated variable for control, and the first b manipulated variable for control, and the arithmetic processing of expression 07x corresponds to the first combining process of the present invention. Further, the third gain coefficient K3_x, and the third manipulated variable component u3_x (the third term on the right side of expression 07x) in the second processing mode respectively corresponds to the first d gain coefficient, the first d manipulated variable component of the present invention. In the present embodiment, the first b gain coefficient and the first d gain coefficient becomes the same value, but the value of the third gain coefficient K3_x may be set to be different in the first processing mode and the second processing mode.

Further, in the present embodiment, the determination processing of STEP23-1 embodies the acceleration request determining element of the present invention. Then, the case where the determination result of STEP23-1 becomes affirmative corresponds to the case where the predetermined first condition is satisfied of the present invention. Moreover, the case where the determination result of STEP24-1 becomes affirmative, or the case where the determination result of STEP24-2 and STEP24-4 becomes affirmative and negative, respectively, correspond to the case where the predetermined second condition is satisfied.

Second Embodiment

Next, a second embodiment of the present invention will be explained with reference to FIG. 17 through FIG. 20. The present embodiment differs from the first embodiment described above only partly in the processing of the control unit 50. For this reason, the description of the same constructions and functions as those of the first embodiment will be allotted with the same reference with the first embodiment, and the detailed explanation will be omitted.

Figure 17:
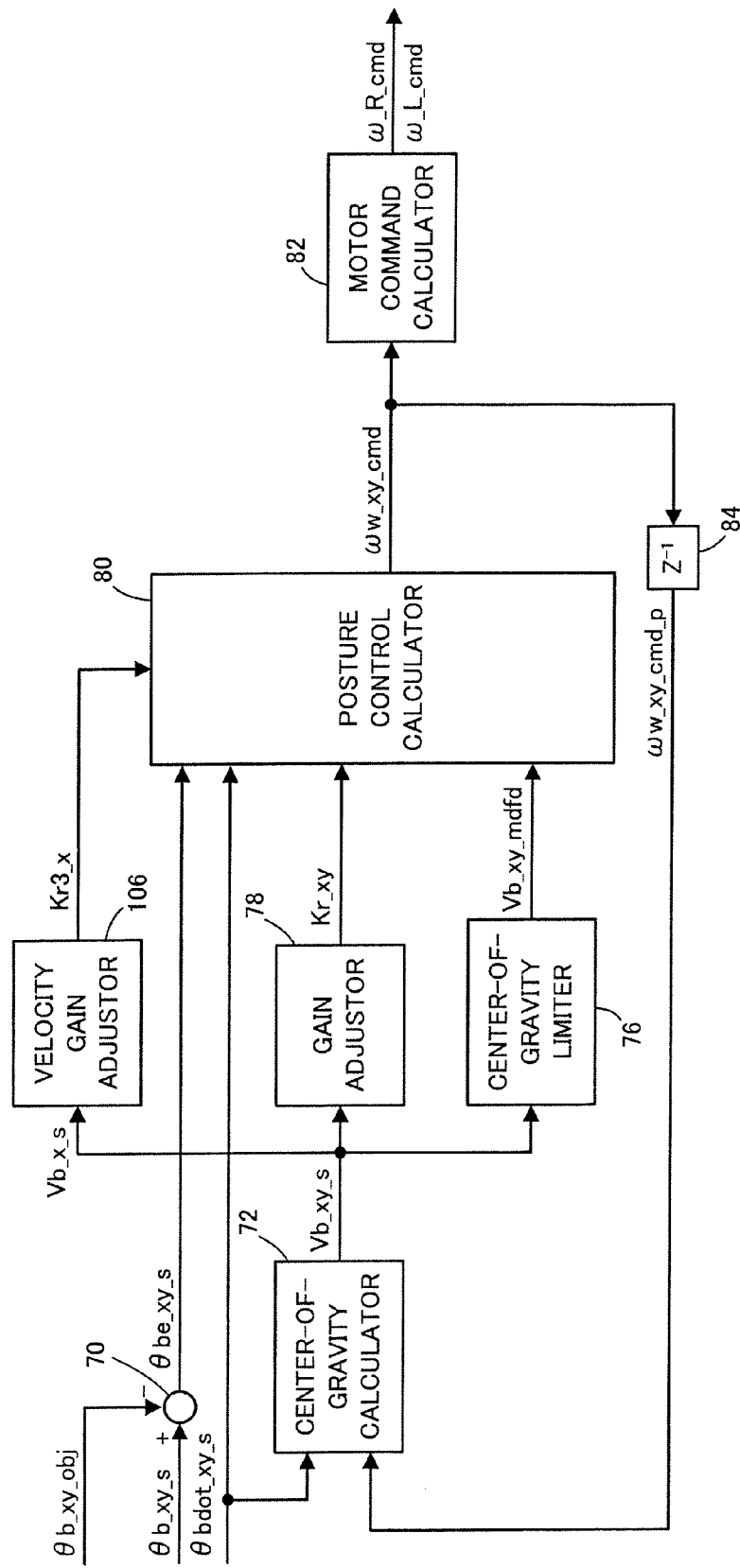
FIG. 17 is a block diagram illustrating a processing function related processing of STEP9 in FIG. 7 in a second embodiment.

In the present embodiment, the control unit 50 has a function indicated in the block diagram of FIG. 17, as a function for embodying the vehicle control arithmetic processing of STEP 9 in FIG. 7 described above.

In this case, in the present embodiment, the control unit 50 is, as is in the first embodiment, equipped with the error calculator 70, the center-of-gravity velocity calculator 72, the gain adjustor 78, the center-of-gravity velocity restrictor 76, the posture control calculator 80, the motor command calculator 82, and the delay element 84.

On the other hand, in the present embodiment, the control unit 50 is equipped with a velocity gain adjustor 106 for determining a gain adjustment parameter, which is for adjusting the value of the third gain coefficient K3_x related to the third manipulated variable component u3_x, in place of the required center-of-gravity velocity generator 74 in the first embodiment. Then, the velocity gain adjustor 106 is input with the estimated center-of-gravity velocity value Vb_x_s calculated by the center-of-gravity velocity calculator 72. Also, the posture control calculator 80 is input with the parameter for gain adjustment Kr_3 determined by the velocity gain adjustor 106, in addition to the base body tilt angle error measured value θbe_xy_s, the base body tilt angular velocity measured value θbdot_xy_s, the gain adjustment parameters Kr_xy, and the desired center-of-gravity velocities for control Vb_xy_mdfd explained in the first embodiment.

In the present embodiment, the value of the required center-of-gravity velocities Vb_x_aim, Vb_y_aim used in the processing of the center-of-gravity velocity restrictor 76 (processing shown in FIG. 12) is constantly 0, in either operating mode of the boarding mode or the autonomous mode. Therefore, in FIG. 17, inputting of the Vb_x_aim, Vb_y_aim to the center-of-gravity velocity restrictor 76 is omitted.

Then, the processing of the control unit 50 in the present embodiment differs from the first embodiment in the processing of the velocity gain adjustor 106 and the processing of a part of the posture control calculator 80, and otherwise is the same with the first embodiment.

In the present embodiment, in the case where the propulsive force in the approximately fore-and-aft direction is imparted to the vehicle 1, the value of the first gain coefficient K3_x is adjusted, in place of variably adjusting the required center-of-gravity velocity Vb_x_aim in the X-axis direction, and consequently the desired center-of-gravity velocity for control Vb_x_mdfd, as is in the first embodiment.

Then, a gain adjustment parameter Kr3_x for adjusting the value of the first gain coefficient K3_x is sequentially determined by the velocity gain adjustor 106. In this case, the velocity gain adjustor 106 determines the gain adjustment parameter Kr3_x according to the processing shown in the flowchart in FIG. 18.

Explanation will be given below. The velocity gain adjustor 106 first carries out the same processing as STEP21 in STEP31, and calculates the center-of-gravity velocity absolute value change rate DVb_x_s.

Subsequently, the velocity gain adjustor 106 carries out the determination processing in STEP32. The determination processing is the same determination processing as STEP22, and it is determined whether the current arithmetic processing mode (the mode on the manner for determining the imaginary wheel rotational angular acceleration commands ωwdot_x_ cmd, ωwdot_x_cmd) is the first processing mode or the second processing mode. In this case, similarly to the first embodiment, the first processing mode is a processing mode for determining ωwdot_x_cmd, ωwdot_x_cmd so as to attenuate the traveling velocity of the vehicle 1 (so as to bring the center-of-gravity velocities Vb_xy in the X-axis direction and the Y-axis direction closer to 0 with the function of the third manipulated variable component u3_xy). Further, the second processing mode is a processing mode for determining ωwdot_x_cmd, ωwdot_x_cmd so that attenuation of the traveling velocity of the vehicle 1 in the X-axis direction is difficult to generate (so that the third manipulated variable component u3_x in the X-axis direction becomes 0 or to a value close thereto) compared to the first processing mode.

Then, in the case where the current arithmetic processing mode is the first processing mode and in the case where the same is the second processing mode in STEP323, the velocity gain adjustor 106 subsequently carries out the arithmetic processing in STEP33 and the arithmetic processing in STEP 34, respectively, and determines a basic value Kr3_x_1 of the gain adjustment parameter Kr3_x (hereinafter referred to as a gain adjustment parameter basic value Kr3_x_1).

Figure 19:
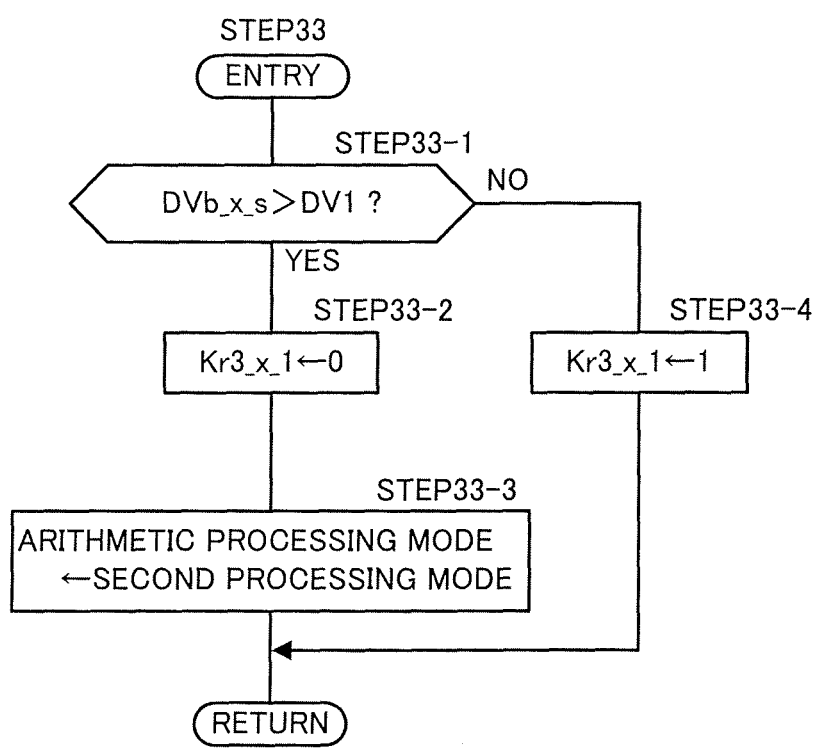
FIG. 19 is a flowchart illustrating the subroutine processing in STEP33 of FIG. 18.

The arithmetic processing for the first processing mode in STEP33 is carried out as is shown in the flowchart of FIG. 19. Specifically, the velocity gain adjustor 106 first carries out the same determination processing as in above-mentioned STEP23-1 in STEP33-1 and determines whether or not the acceleration request of the vehicle 1 is generated.

Then, in the case where the determination result in STEP33-1 is negative (in the case where no acceleration request is generated), the velocity gain adjustor 106 determines the value of the gain adjustment parameter basic value Kr3_x_1 to 1 in STEP33-4, and terminates the processing in FIG. 19. In this case, the arithmetic processing mode is not changed, and the arithmetic processing mode is maintained to the first processing mode even in the next control processing cycle.

Further, in the case where the determination result of STEP33-1 is affirmative (in the case where acceleration request has been generated), the velocity gain adjustor 106 sets the value of the gain adjustment parameter basic value Kr3_x_1 to 0 in STEP33-2. Further, in STEP33-3, the velocity gain adjustor 106 changes the arithmetic processing mode from the first processing mode to the second processing mode, and terminates the processing in FIG. 19.

The above explains the arithmetic processing for the first processing mode in STEP33.

Figure 20:
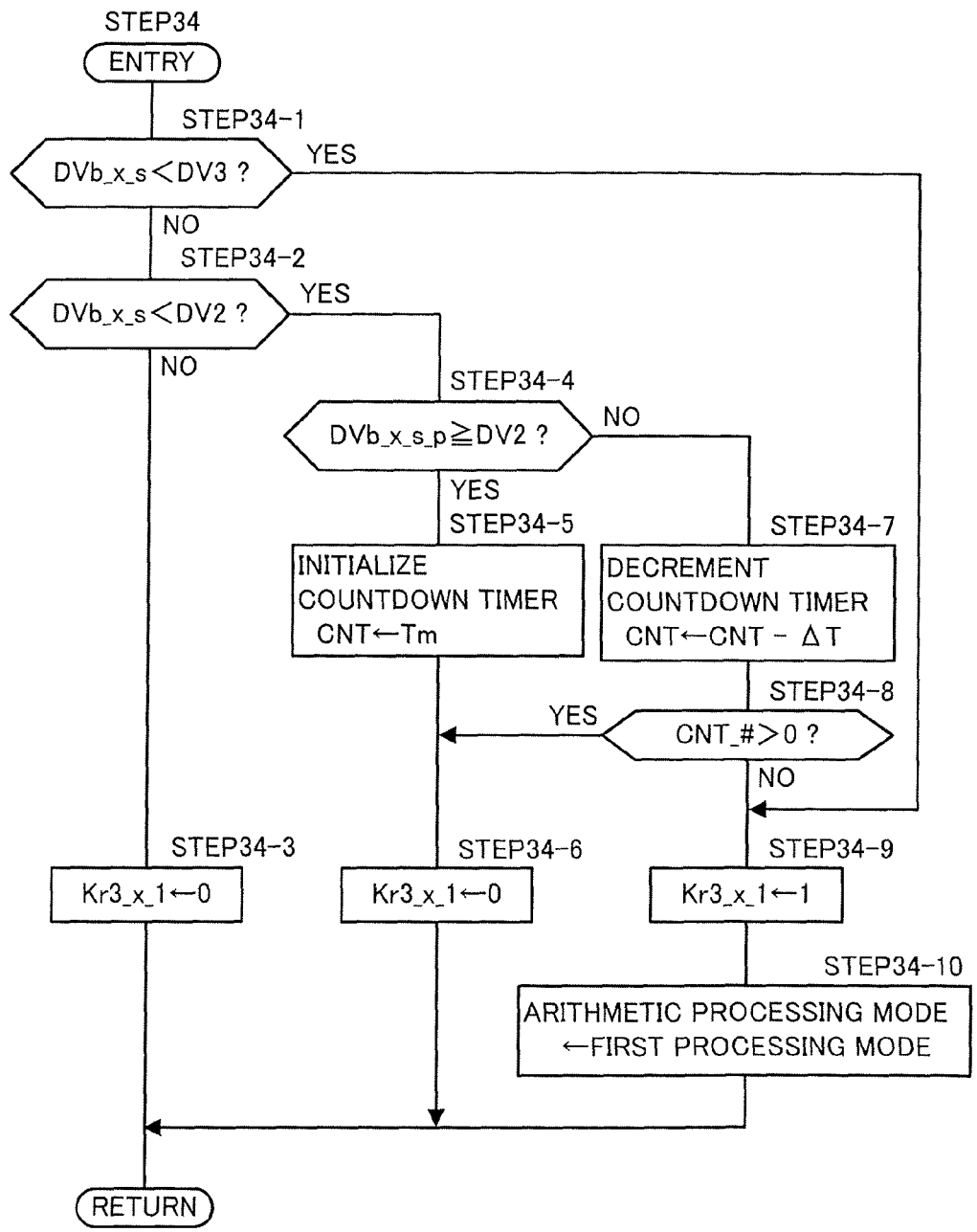
FIG. 20 is a flowchart illustrating the subroutine processing in STEP34 of FIG. 18.

Subsequently, the arithmetic processing for the second processing mode in STEP34 is carried out as is shown in the flowchart of FIG. 20. Specifically, the velocity gain adjustor 106 carries out the same determination processing as STEP24-1 in STEP34-1, and determines whether or not the deceleration request of the vehicle 1 is generated.

Then, in the case where the determination result is affirmative (in the case where the deceleration request has been generated), the velocity gain adjustor 106 sets the gain adjustment parameter basic value Kr3_x_1 to 1 in STEP34-9. Thereafter, the velocity gain adjustor 106 returns the arithmetic processing mode from the second processing mode to the first processing mode in STEP34-10, and terminates the processing in FIG. 20.

Further, in the case where the determination result in STEP34-1 is negative (in the case where no deceleration request is generated), the velocity gain adjustor 106 carries out the same determination processing as STEP24-2 in STEP34-2 thereby to determine whether or not the acceleration request is resolved. Thereafter, in the case where the determination result in STEP34-2 is affirmative (in the case where it is regarded that the acceleration request is continuing), the velocity gain adjustor 106 determines the value of the gain adjustment parameter basic value Kr3_x_1 to 0 in STEP34-3, and terminates the processing in FIG. 20. In this case, the arithmetic processing mode is maintained at the second processing mode even in the next control processing cycle.

On the other hand, in the case where the determination result in STEP34-2 is affirmative, the velocity gain adjustor 106 carries out the same determination processing as STEP24-4 in STEP34-4, in order to determine whether or not the current control processing cycle is a timing immediately after the state where the acceleration request is continuing is switched to the resolved state.

Then, by carrying out the same processing as STEP24-5 in STEP34-5, the velocity gain adjustor 106 initializes the time count value CNT (sets the predetermine time Tm as the time count value CNT) of the countdown timer for counting the elapsed time from resolving of the acceleration request.

Subsequently, the velocity gain adjustor 106 determines the value of the gain adjustment parameter basic value Kr3_x_1 to 0 in STEP34-6, and terminates the processing of FIG. 20. In this case, the arithmetic processing mode is maintained at the second processing mode even in the next control processing cycle.

In the case where the determination result in STEP34-4 is negative (in the case where the state in which no acceleration request and deceleration request is generated after resolving of the acceleration request, is continuing), the velocity gain adjustor 106 decrements the time count value CNT of the countdown timer by carrying out the same processing as STEP24-7 in STEP34-7.

Subsequently, by carrying out the same determination processing as STEP24-8 in STEP34-8, the velocity gain adjustor 106 determines whether or not the counting of the countdown timer is finished.

In the case where the determination result in STEP34-8 is affirmative (in the case where the predetermined time Tm has not lapsed since resolving of the acceleration request), the velocity gain adjustor 106 determines the value of the gain adjustment parameter basic value Kr3_x_1 to 0 in STEP34-6, and terminates the processing in FIG. 20. In this case, the arithmetic processing mode is maintained at the second processing mode even in the next control processing cycle.

Further, in the case where the determination result in STEP34-8 became negative (in the case where the predetermined time Tm lapsed since resolving of the acceleration request), the velocity gain adjustor 106 carries out the processing in above-mentioned STEP34-9, 34-10, and terminates the processing of FIG. 20. That is, the velocity gain adjustor 106 determines, the value of the gain adjustment parameter basic value Kr3_x_1 to 1, and returns the arithmetic processing mode from the second processing mode to the first processing mode.

The above explains the arithmetic processing for the second processing mode in STEP34.

Figure 18:
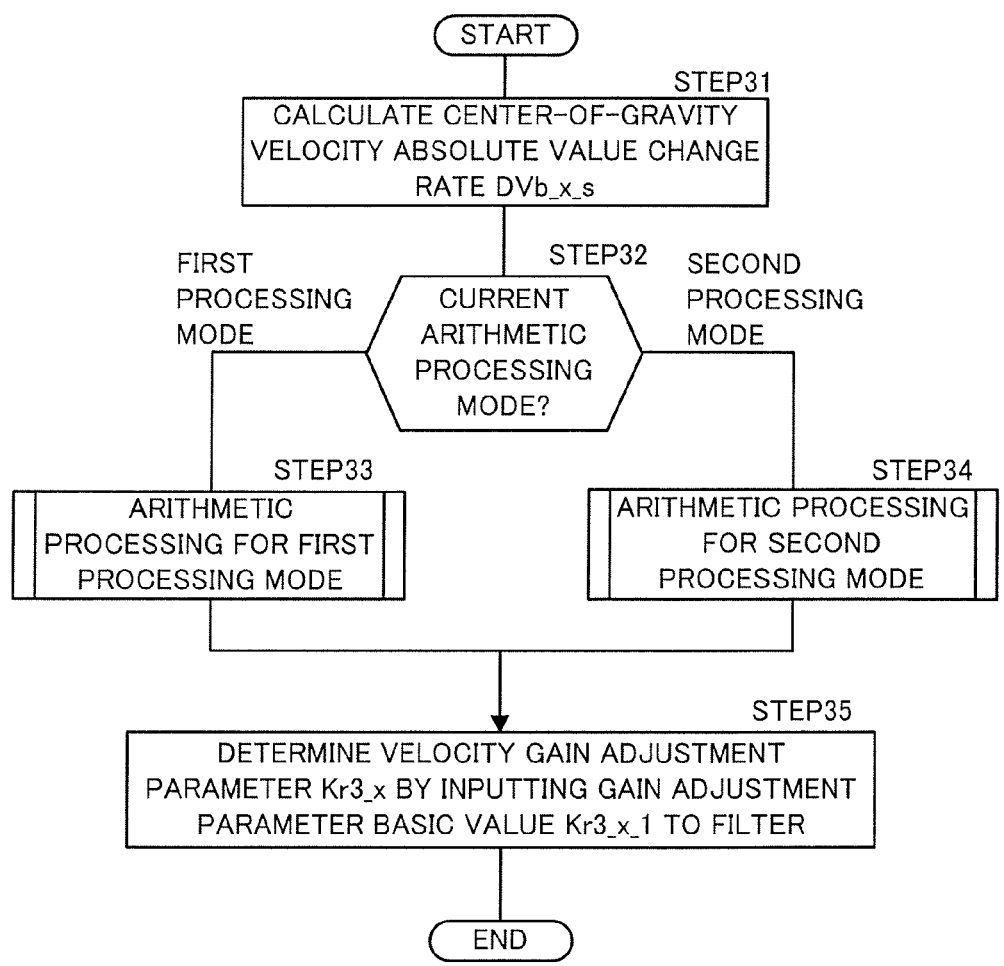
FIG. 18 is a flowchart illustrating the processing of a velocity gain adjustor 106 shown in FIG. 17.

Returning to the description of FIG. 18, after carrying out either of the arithmetic processing of STEP33, 34, the velocity gain adjustor 106 subsequently carries out the processing of inputting the gain adjustment parameter basic value Kr3_x_1 which is determined by the arithmetic processing in STEP35 through the filter, so as to finally determine the gain adjustment parameter Kr3_x.

The filter is, for example, a first-order lag filter (low-pass filter). Therefore, the gain adjustment parameter Kr3_x follows the gain adjustment parameter basic value Kr3_x_1 by a certain time constant. As such, the gain adjustment parameter Kr3_x follows Kr3_x_1 (stationary coincide with Kr3_x_1) while changing smoothly.

The above is the details of the processing of the velocity gain adjustor 106.

Supplementarily, as is the same with the time constant related to the filter used in STEP25 in the first embodiment, the time constant of the filter used in STEP35 may be changed according to the arithmetic processing mode and the like. For example, the time constant of the filter may be set to a relatively long time value in the first processing mode, and the time constant of the filter may be set to a relatively short time value in the second processing mode. Further, for example, in the first processing mode, the time constant of the filter may be set shorter so as to make the gain adjustment parameter Kr3_x rapidly return to 1 in the state where the deceleration request is generated, than in the state where the deceleration request is not generated.

Further, for example, immediately after the arithmetic processing mode changes from the second processing mode to the first processing mode, the gain adjustment parameter basic value Kr3_x_1 itself may be changed gradually at a predetermined rate of change (a predetermined temporal change rate) from 0 to 1.

In the present embodiment, the posture control calculator 80, to which the gain adjustment parameter Kr3_x determined as is explained above is input, determines the imaginary wheel rotational angular acceleration commands ωwdot_x_cmd, ωwdot_y_cmd as the manipulated variable (control input) as will be described below. Thereafter, as is the same with the first embodiment, the posture control calculator 80 determines and outputs the imaginary wheel rotational velocity commands ωw_x_cmd, ωw_y_cmd, by integrating ωwdot_x_cmd, ωwdot_y_cmd.

In this case, in the present embodiment, the manner of determining the imaginary wheel rotational angular acceleration command ωwdot_y_cmd related to the Y-axis direction is the same as the first embodiment. That is, the posture control calculator 80 uses the gain adjustment parameter Kr_y input from the gain adjustor 78 and determines the first through the third gain coefficients Ki_y (i=1, 2, 3) from aforesaid expression 09y. Thereafter, the posture control calculator 80 uses the determined first through third gain coefficients Ki_y (i=1, 2, 3) and determines ωwdot_y_cmd by calculation of aforesaid expression 07y.

On the other hand, in the present embodiment, the manner of determining the imaginary wheel rotational angular acceleration command ωwdot_x_cmd related to the X-axis direction differs from the first embodiment. Specifically, similarly to the first embodiment, the posture control calculator 80 first determines the first through third gain coefficients Ki_x (i=1, 2, 3) using the gain adjustment parameter Kr_x input from the gain adjustor 78 by aforesaid expression 09x. Then, the posture control calculator 80 determines the imaginary wheel rotational angular acceleration command ωwdot_x_cmd using the first through third gain coefficients Ki_x (i=1, 2, 3) and the gain adjustment parameter Kr3_x input from the velocity gain adjustor 106, by calculation of the following expression 07x2.

$$\omega wdot\_x\_cmd = K1\_x \cdot \theta be\_x\_s + K2\_x\_\theta bdot\_x\_s + (K3\_x \cdot Kr3\_x) \cdot (Vb\_x\_s - Vb\_x\_mdfd) \quad \text{expression 07x2}$$

That is, the posture control calculator 80 determines ωwdot_x_cmd with the expression using a gain coefficient (=K3_x·Kr3_x) obtained by multiplying the gain coefficient K3_x by the gain adjustment parameter Kr3_x, in place of the gain coefficient K3_x in the third term of the right side of aforesaid expression 07x (the third manipulated variable component u3_x). In this case, in the case where Kr3=0, then the third term of the expression 07x2 becomes 0.

The present embodiment is identical to the first embodiment other than the matters explained above.

According to the present embodiment, the effect similar to that in the first embodiment may be obtained.

More specifically, a case is assumed where the propulsive force in an approximately fore-and-aft direction is imparted to the vehicle 1, similarly to the case in the first embodiment, in the situation where the arithmetic processing mode is maintained continuously at the first processing mode.

Here, for the sake of understanding, it is assumed that the actual center-of-gravity velocities Vb_x, Vb_y are values that falls within a range that the output values V_x_lim2, V_y_lim2 at the limit processor 104 are not subjected to the forcible restriction. That is, the operating state of the vehicle 1 is the normal (general) operating state, and the desired center-of-gravity velocities for control Vb_x_mdfd, Vb_y_mdfd coincides with the required center-of-gravity velocities Vb_x_aim, Vb_y_aim (in the present embodiment, Vb_x_aim=Vb_y_aim=0), respectively.

In this case, if the determination result in STEP33-1 becomes affirmative (if the acceleration request has been generated) by imparting the propulsive force to the vehicle 1, the arithmetic processing mode is changed from the first processing mode to the second processing mode, by the processing of STEP33-3 in FIG. 19.

Then, in the second processing mode, in the situation where no deceleration request is generated (the situation where the determination result in STEP34-1 becomes negative), the value of the gain adjustment parameter basic value Kr3_x_1 is determined to 0, in the period after resolving of the acceleration request until lapse of the predetermined time Tm.

Therefore, the gain adjustment parameter Kr3_x is retained at 0, or determined to a value closer to 0 than 1.

Here, as is apparent from aforesaid expression 07x2, in the present embodiment, for the X-axis direction, K3_x·Kr3_x corresponds to the sensitivity to change in ωwdot_x_cmd with respect to change in Vb_x_s (the sensitivity to velocity). Then, as is explained above, in the situation where Kr3_x is retained at 0, or determined to a value closer to 0 than 1 in the second processing mode, K3_x·Kr3_x, and consequently, the sensitivity to velocity becomes 0 or a value close thereto. Therefore, ωwotw_x_cmd has low dependency with respect to Vb_x_s, so that even if Vb_x_s changes, ωwdot_x_cmd does not change or the change thereof will be minute. Consequently, the driving force to be imparted in the X-axis direction to the wheel assembly 5 by the electric motors 31R, 31L becomes difficult to receive the regulation according to the value of Vb_x_s. As a result, the vehicle 1 smoothly accelerates in the fore-and-aft direction of the occupant by the propulsive force applied thereto.

Next, in the second processing mode, when imparting of the propulsive force to the vehicle 1 is finished, and the acceleration request is continuously resolved (when the determination result in STEP34-2, 34-4 in FIG. 20 becomes affirmative and negative, respectively), the value of the gain adjustment parameter basic value Kr3_x_1 is retained at 0, in a period until lapse of the predetermined time Tm. Therefore, the gain adjustment parameter Kr3_x is also retained at 0.

Further, in such situation, aforesaid sensitivity to velocity also becomes 0, and ωwdot_x_cmd does not receive influence from Vb_x_s. Therefore, even when the acceleration request is resolved, the driving force to be imparted to the X-axis direction to the wheel assembly 5 by the electric motors 31R, 31L does not receive influence from the value of Vb_x_s, during the period after the resolving of the acceleration request until lapse of the predetermined time Tm unless a deceleration request is generated.

As a result, similarly to the first embodiment, after acceleration of the vehicle 1, during the period of the predetermined time Tm, the gliding state of the vehicle 1 is maintained even when the occupant does not perform maneuvering operation such as positively moving its upper body.

Subsequently, in the second processing mode, in the case where the deceleration request has been generated, or after lapse of the predetermined time Tm after resolving of the acceleration request, the value of the gain adjustment parameter basic value Kr3__x_1 is changed from 0 to 1. Therefore, the gain adjustment parameter Kr3__x approaches 1 from 0, and is finally retained at 1.

In this case, the third term of aforesaid expression 07x2 (the third manipulated variable component u3__x) increases in the braking direction. Therefore, the traveling velocity in the X-axis direction of the vehicle 1 attenuates.

Supplementarily, in the first processing mode in the present embodiment, aforesaid sensitivity to velocity coincides with the third gain coefficient K3__x (>K3__x·Kr3__x), or approaches K3__x from K3__x·Kr3__x. Therefore, even in the present embodiment, the sensitivity to speed in the second processing mode becomes relatively lower than that in the first processing mode. Further, in the first processing mode, the driving force to be imparted to the wheel assembly 5 so as to bring Vb_x_s closer to 0 acts stronger than that in the second processing mode.

Further, with respect to the Y-axis direction, the third gain coefficient K3__y is the same in the first processing mode and the second processing mode. Therefore, in either of the first processing mode and the second processing mode, the traveling velocity Vb_y of the vehicle system center-of-gravity point in the Y-axis direction is difficult to change, similar to the first embodiment.

Here, in the present embodiment, the value of the gain adjustment parameter basic value Kr3__x_1 is set to 0 in STEP34-3, 34-6 in the second processing mode. However, the value of Kr3__x_1 may be set to a slightly larger value than 0 (for example, 0.1) in both of or either one of STEP34-3, 34-6. Even in this case, basically, it becomes possible to make the driving force imparted in the X-axis direction to the wheel assembly 5 difficult to receive influence of the value of Vb_x_s, making the sensitivity to velocity sufficiently small in the second processing mode.

Here, the correspondence relationship between the vehicle 1 of the present embodiment and the present invention will be supplementally described.

In the present embodiment, the first gain coefficient K1__x, the third gain coefficient K3__x, the first manipulated variable component u1__x (the first term on the right side of expression 07x), and the third manipulated variable component u3__x (the third term on the right side of expression 07x) in the first processing mode corresponds to the first a gain coefficient, the first b gain coefficient, the first a manipulated variable component, and the first b manipulated variable component of the present invention, and the arithmetic processing of expression 07x corresponds to the first synthesis processing of the present invention. Further, the product of the third gain coefficient K3__x and the gain adjustment parameter Kr3__x (=K3__x·Kr3__x), and the third term on the right side of expression 07x2 in the second processing mode corresponds to the first d gain coefficient and the first d manipulated variable component, respectively.

Further, in the present embodiment, the determination processing of STEP33-1 embodies the acceleration request determining element of the present invention. Then, the case where the determination result of STEP33-1 becomes affirmative corresponds to the case where the predetermined first condition is satisfied of the present invention. Moreover, the case where the determination result of STEP34-1 becomes affirmative, or the case where the determination result of STEP34-2 and STEP34-4 becomes affirmative and negative, respectively, correspond to the case where the predetermined second condition is satisfied of the present invention.

The corresponding relationship of the present embodiment and the present invention is the same as the case in the first embodiment, other than those explained above.

Next, some modified embodiments related to the embodiments explained above will be explained below.

In each embodiment explained above, with respect to the Y-axis direction the imaginary wheel rotational angular acceleration command ωwdot_y_cmd as the manipulated variable has been determined with the same processing in the first processing mode and the second processing mode. However, ωwdot_y_cmd may be determined by a process different in the first processing mode and the second processing mode, similarly to that in the X-axis direction. In this case, for example, the required center-of-gravity velocity Vb_y_aim in the Y-axis direction may be determined so as to be changed in the first processing mode and the second processing mode, similarly to the first embodiment. Alternatively, for example, the gain adjustment parameter for adjusting the gain coefficient in the third term of aforesaid expression 07y may be determined to be changed in the first processing mode and the second processing mode, in a similar manner to that in the second embodiment, and ωwdot_y_cmd may be determined from an expression in which the gain adjustment parameter is multiplied by the third term of expression 07y.

Further, in each of the aforesaid embodiments, the vehicle 1 having the structure illustrated in FIG. 1 and FIG. 2 has been exemplified. However, the inverted pendulum type vehicle 1 in the present invention is not limited to the vehicle 1 exemplified in the aforesaid embodiments.

To be more specific, the wheel assembly 5 serving as the traveling motion unit of the vehicle 1 in the aforesaid embodiments has the one-piece construction. Alternatively, however, the wheel assembly 5 may have a construction shown in, for example, FIG. 10 of the aforesaid patent document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

Further, the traveling motion unit may have a crawler-shaped structure, as shown in, for example, FIG. 3 of patent document 2.

Figure 5:
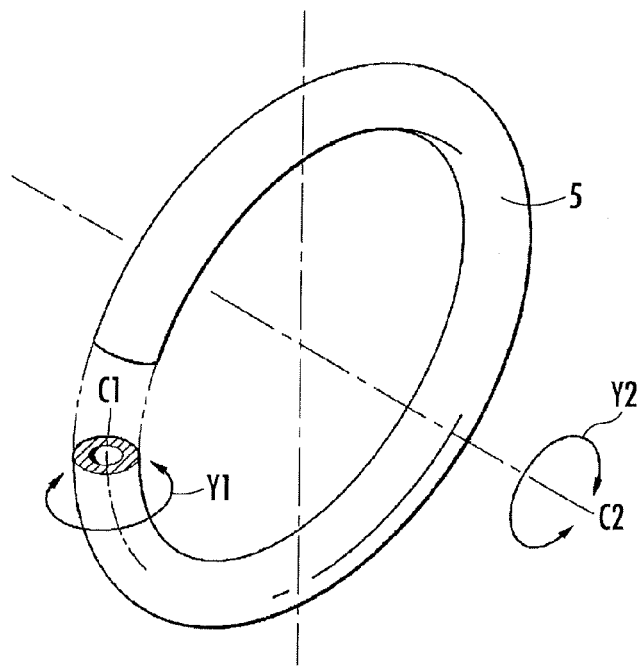
FIG. 5 is a perspective view of a traveling motion unit (wheel unit) of the inverted pendulum type vehicle according to the embodiment.

Alternatively, as shown in, for example, FIG. 5 of the aforesaid patent document 2, FIG. 7 of patent document 3, or FIG. 1 of patent document 1, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Further, in the aforesaid embodiments, the vehicle 1 provided with the seat 3 as the boarding section for an occupant has been exemplified. Alternatively, however, the inverted pendulum type vehicle in accordance with the present invention may be a vehicle having a construction wherein a step on which an occupant rests his/her both feet and a section to be gripped by the occupant standing on the step are mounted on a base body, as illustrated in, for example, FIG. 8 in patent document 3.

Thus, the present invention can be applied to inverted pendulum type vehicles of various constructions, as illustrated in the aforesaid patent documents 1 to 3 and the like.

Further, the inverted pendulum type vehicle in accordance with the present invention may be provided with a plurality of traveling motion units (e.g., two in the lateral direction, or two in the fore-and-aft direction, or three or more).

Further, it is not necessary for the traveling motion unit to be movable in all of the directions, and it may be movable only in one direction. In this case, a boarding part of the object to be carried may be fixed to the base body so as to be tiltable about one axis only. For example, in stead of the wheel assembly 5 in the above-mentioned embodiments, a traveling motion unit capable of moving in the X-axis direction (the fore-and-aft direction of the occupant) and is not capable of tilting (or is difficult to tilt) in the direction about the X-axis direction (for example, a traveling motion unit in which a plurality of wheels rotatable about the axis in the Y-axis direction are coaxially arranged in parallel to one another may be provided to the vehicle 1. And, in this case, the boarding part of the object to be carried may be made tiltable about the axis in the Y-axis direction, and the traveling motion unit may move in the X-axis direction in accordance with the tilting.

Further, in the inverted pendulum type vehicle in accordance with the present invention, it is not necessary for the base body to tilt together with the boarding unit of the occupant. For example, in the case where the vehicle includes a plurality of the traveling motion units, the base body to which the traveling motion units are assembled may be made so that the base body does not tilt with respect to the floor surface, and the boarding unit may be assembled to the base body so as to be freely tiltable.

DESCRIPTION OF REFERENCE NUMERALS

1 . . . inverted pendulum type vehicle; 3 . . . sheet (payload supporting part); 5 . . . wheel assembly (traveling motion unit); 7 . . . actuator; 9 . . . base body; 52 . . . tilt sensor (tilt angle measuring element); 72 . . . center-of-gravity calculator (representative point velocity measuring element); STEP2 . . . tilt posture measuring element; STEP9 and STEP10 . . . traveling motion unit controlling element; and STEP23-1 . . . acceleration request determining element

The invention claimed is:

1. A control device of an inverted pendulum type vehicle having a traveling motion unit capable of moving on a floor surface, an actuator which drives the traveling motion unit, a base body on which the traveling motion unit and the actuator are mounted, and a payload supporting part of an occupant assembled to the base body so as to be tiltable with respect to a perpendicular direction, comprising:
a tilt angle measuring element which generates an output according to an actual tilt angle of the payload supporting part;
a representative point velocity measuring element which generates an output according to a traveling velocity of a predetermined representative point of the vehicle; and
a traveling motion unit controlling element which determines a manipulated variable for control which defines a driving force to be imparted to the traveling motion unit, and which controls the traveling motion of the traveling motion unit via the actuator according to the determined manipulated variable for control;
wherein the traveling motion unit controlling element includes, as processing modes for determining the manipulated variable for control in a state where the occupant is aboard the payload supporting part, a first processing mode and a second processing mode, the second processing mode being the mode which is transited from the first processing mode in a case where a predetermined first condition is satisfied during carrying out of the processing of the first processing mode, and
the traveling motion unit controlling element determines, in the first processing mode, the manipulated variable for control at least according to a tilt error, which is an error between a measured value of the actual tilt angle of the payload supporting part indicated by the output of the tilt angle measuring element and a predetermined desired tilt angle, and a velocity error, which is an error between a measured value of the traveling velocity of the representative point indicated by the output of the representative point velocity measuring element and a predetermined desired traveling velocity, so as to bring the tilt error and the velocity error closer to 0, and
the traveling motion unit controlling element determines, in the second processing mode, the manipulated variable for control at least according to the tilt error, so as to make a sensitivity to change of the manipulated variable for control with respect to a change in the measured value of the traveling velocity of the representative point or in a component in a predetermined direction out of the measured value of the traveling velocity of the representative point relatively smaller than that in the first processing mode, and so as to bring at least the tilt error out of the tilt error and the velocity error closer to 0.

2. The control device of the inverted pendulum type vehicle according to claim 1,
wherein the traveling motion unit is configured to be capable of moving in all directions including a first direction and a second direction which are orthogonal to each other on a floor surface, and the payload supporting part is assembled to the base body so as to be tiltable about two axes, about the axis in the first direction and about the axis in the second direction,
the traveling motion unit controlling element determines, in the first processing mode, the manipulated variable for control so as to bring a first tilt error component, which is a component about an axis in the second direction, and a second tilt error component, which is a component about an axis in the first direction, out of the tilt error, a first velocity error component, which is a component in the first direction, and a second velocity error component, which is a component in the second direction, out of the velocity error, closer to 0, respectively, and
the traveling motion unit controlling element determines, in the second processing mode, the manipulated variable for control, so as to make a sensitivity to change of the manipulated variable for control with respect to a change in at least the component in the first direction out of the measured value of the traveling velocity of the representative point to be relatively smaller than that in the first processing mode, and also to bring at least the first tilt error component and the second tilt error component out of the first tilt error component, the second tilt error component, the first velocity error component, and the second velocity error component, closer to 0.

3. The control device of the inverted pendulum type vehicle according to claim 2,
wherein the first direction and the second direction are set to a fore-and-aft direction and a lateral direction of the occupant aboard the payload supporting part, respectively, and the traveling motion unit controlling element determines, in the second processing mode, the manipulated variable for control at least according to the first tilt error component, the second tilt error component, and the second velocity error component, so as to make the sensitivity to change of the manipulated variable for control with respect to the change in at least the component in the first direction out of the measured value of the traveling velocity of the representative point relatively smaller than that in the first processing mode and so as not to make the sensitivity to change of the manipulated variable for control with respect to the change in the component in the second direction out of the measured value of the traveling velocity of the representative point smaller than that in the first processing mode, and to bring at least the first tilt error component, the second tilt error component, and the second velocity error component out of the first tilt error component, the second tilt error component, the first velocity error component, and the second velocity error component closer to 0.

4. The control device of the inverted pendulum type vehicle according to claim 2,
wherein the manipulated variable for control is configured from a first manipulated variable for control which defines a driving power to be imparted to the traveling motion unit so as to control the traveling motion of the traveling motion unit in the first direction, and a second manipulated variable for control which defines a driving power to be imparted to the traveling motion unit so as to control the traveling motion of the traveling motion unit in the second direction,
the traveling motion unit controlling element determines, in the first processing mode, the first manipulated variable for control by a first synthesis processing which synthesizes a predetermined plurality of kinds of manipulated variable components including at least a first a manipulated variable component obtained by multiplying the first tilt error component by a first a gain coefficient and a first b manipulated variable component obtained by multiplying the first velocity error component by a first b gain coefficient, and determines the second manipulated variable for control by a second synthesis processing which synthesizes a predetermined plurality of kinds of manipulated variable components including at least a second a manipulated variable component obtained by multiplying the second tilt error component by a second a gain coefficient, and a second b manipulated variable component obtained by multiplying the second velocity error component by a second b gain coefficient, and
determines, in the second processing mode, the first manipulated variable for control by the first synthesis processing using any one of a first c manipulated variable component obtained by multiplying the first velocity error component by a first c gain coefficient having smaller absolute value than the first b gain coefficient, a first d manipulated variable component obtained by multiplying an error between a component in the first direction out of the measured value of the traveling velocity of the representative point and a desired traveling velocity of the representative point in the first direction determined variably according to the component so as to coincide with or follow the component by a first d gain coefficient, and 0, in place of the first b manipulated variable component, and determines the second manipulated variable for control by the second synthesis processing which is the same as that in the first processing mode.

5. The control device of the inverted pendulum type vehicle according to claim 1,
wherein the traveling motion unit is capable of traveling on the floor surface at least in the first direction as the predetermined direction, and the manipulated variable for control at least includes a first manipulated variable for control which defines a driving force to be imparted to the traveling motion unit so as to control the traveling motion of the traveling motion unit in the first direction,
the traveling motion unit controlling element
determines, in the first processing mode, the first manipulated variable for control by a first synthesis processing which synthesizes a predetermined plurality of kinds of manipulated variable components including at least a first a manipulated variable component obtained by multiplying the tilt error about the axis in a direction orthogonal to the first direction by a first a gain coefficient and a first b manipulated variable component obtained by multiplying the velocity error in the first direction by a first b gain coefficient, and
determines, in the second processing mode, the first manipulated variable for control by the first synthesis processing using any one of a first c manipulated variable component obtained by multiplying the velocity error in the first direction by a first c gain coefficient having smaller absolute value than the first b gain coefficient, a first d manipulated variable component obtained by multiplying an error between the measured value of the traveling velocity of the representative point in the first direction and a desired traveling velocity of the representative point in the first direction determined variably according to the measured value so as to coincide with or follow the measured value by a first d gain coefficient, and 0, in place of the first b manipulated variable component.

6. The control device of the inverted pendulum type vehicle according to claim 1,
wherein the traveling motion unit controlling element restarts the processing of the first processing mode, in a case where a predetermined second condition is satisfied during carrying out of the processing of the second processing mode.

7. The control device of the inverted pendulum type vehicle according to claim 6,
further comprising an acceleration request determining element which determines whether or not an acceleration request, which is a request for increasing the traveling velocity of the representative point, is generated,
wherein the traveling motion unit controlling element starts carrying out of the processing of the second processing mode, determining that the predetermined first condition is satisfied, in a case where the determination result of the acceleration request determining element becomes affirmative during carrying out of the processing of the first processing mode.

8. The control device of the inverted pendulum type vehicle according to claim 7,
wherein the traveling motion unit controlling element restarts the processing of the first processing mode, determining that the predetermined second condition is satisfied, in a case where a state in which the determination result of the acceleration request determining element becomes negative is continued for a predetermined period during carrying out of the processing of the second processing mode.

9. The control device of the inverted pendulum type vehicle according to claim 7, wherein the vehicle is a vehicle capable of increasing the traveling velocity of the representative point by an external force other than the propulsive force of the vehicle generated by driving the traveling motion unit with the actuator, in the case where the external force is imparted, and the acceleration request determining element determines whether or not the acceleration request is generated, according to a velocity rate of change which is at least a temporal change rate of a magnitude of the measured value of the traveling velocity of the representative point or a temporal change rate of a magnitude of a component in the predetermined direction out of the measured value.

* * * * *